(12) United States Patent
Desanti et al.

(10) Patent No.: US 12,363,119 B2
(45) Date of Patent: Jul. 15, 2025

(54) ACCESS ENFORCEMENT THROUGH AUTHENTICATION VERIFICATION ENTITY (AVE)

(71) Applicant: DELL PRODUCTS L.P., Round Rock, TX (US)

(72) Inventors: Claudio Desanti, Santa Cruz, CA (US); David Black, Acton, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 242 days.

(21) Appl. No.: 17/967,416

(22) Filed: Oct. 17, 2022

(65) Prior Publication Data

US 2024/0129314 A1     Apr. 18, 2024

(51) Int. Cl.
*H04L 9/40* (2022.01)

(52) U.S. Cl.
CPC .......... *H04L 63/101* (2013.01); *H04L 63/102* (2013.01); *H04L 63/20* (2013.01)

(58) Field of Classification Search
CPC ...... H04L 63/101; H04L 63/102; H04L 63/20
See application file for complete search history.

(56) References Cited

U.S. PATENT DOCUMENTS

| | | |
|---|---|---|
| 2007/0086724 A1 | 4/2007 | Grady |
| 2010/0127822 A1 | 5/2010 | Devadas |
| 2010/0153672 A1* | 6/2010 | Jogand-Coulomb ........................ G06F 13/4243 711/163 |
| 2011/0082966 A1 | 4/2011 | Yu |
| 2011/0307947 A1* | 12/2011 | Kariv ....................... H04L 63/08 726/9 |

(Continued)

FOREIGN PATENT DOCUMENTS

| | | |
|---|---|---|
| CN | 101409620 A | 4/2009 |
| CN | 103597496 A | 2/2014 |

(Continued)

OTHER PUBLICATIONS

Nguyen et al., "Exploring Challenge-Response Mechanism Designs for IoT Initial Trust Establishment," 2018 IEEE International Conference on Communications Workshops (ICC Workshops), 2018, pp. 1-6, doi: 10.1109/ICCW.2018.840377 4. (Year: 2018) (6pgs).

(Continued)

*Primary Examiner* — Kambiz Zand
*Assistant Examiner* — Afaq Ali
(74) *Attorney, Agent, or Firm* — BAUGH LAW, LLC

(57) ABSTRACT

Two main methods exist today to enforce access control in a network fabric: soft zoning and hard zoning. However, each of these approaches has some significant drawbacks. Accordingly, presented herein are new and improved systems and methods to perform access control enforcement, which is stronger than soft zoning, and does not need to interact with the fabric switches, as required by hard zoning. In one or more embodiments, an authentication verification entity (AVE) is provided with access control or authorization information. In one or more embodiments, the AVE uses this information to cause an authentication verification failure for connections between hosts and subsystems that are not allowed according to configurations (e.g., zoning configurations) of the fabric.

20 Claims, 18 Drawing Sheets

(56) References Cited

U.S. PATENT DOCUMENTS

| | | | | |
|---|---|---|---|---|
| 2013/0031605 | A1* | 1/2013 | Huston, III | H04L 67/02 |
| | | | | 726/3 |
| 2015/0249645 | A1* | 9/2015 | Sobel | H04L 63/0815 |
| | | | | 726/12 |
| 2018/0246991 | A1* | 8/2018 | Miya | G06F 21/60 |
| 2019/0042480 | A1 | 2/2019 | Khatib Zadeh | |
| 2019/0305969 | A1 | 10/2019 | Iijima | |
| 2019/0327271 | A1* | 10/2019 | Saxena | G06F 8/38 |
| 2020/0403813 | A1 | 12/2020 | Suresh | |
| 2020/0409893 | A1* | 12/2020 | Puttagunta | H04L 69/16 |
| 2021/0243035 | A1* | 8/2021 | Ruane | H04L 9/0897 |
| 2021/0377730 | A1* | 12/2021 | Scurry | H04W 12/08 |
| 2022/0046058 | A1* | 2/2022 | Sampathkumar | G06F 8/65 |
| 2022/0092167 | A1 | 3/2022 | Bishop | |
| 2022/0377054 | A1* | 11/2022 | Shukla | H04L 9/3226 |

FOREIGN PATENT DOCUMENTS

| | | |
|---|---|---|
| CN | 103946806 A | 7/2014 |
| EP | 2911335 A1 | 8/2015 |
| GB | 2588647 A | 5/2021 |
| WO | 2014201059 A1 | 12/2014 |
| WO | 2018183926 A1 | 10/2018 |
| WO | 2020078591 A1 | 4/2020 |

OTHER PUBLICATIONS

IEEE, "IEEE Standard for Discovery, Authentication, and Authorization in Host Attachments of Storage Devices," in IEEE Std 1667-2018 (Revision of IEEE Std 1667-2015), vol. no., pp. 1-226, Oct. 2, 2018, doi: 10.1109/1EEESTD.2018.8479380. (Year: 2018) (226pgs).

Kursawe et al., "Reconfigurable Physical Unclonable Functions—Enabling technology for tamper-resistant storage," 2009 IEEE International Workshop on Hardware-Oriented Security and Trust, 2009, pp. 22-29, doi: 10.1109/HST.2009.5225058. (Year: 2009) (8pgs).

Kumar et al., "PHAP: Password based Hardware Authentication using PUFs," 2012 45th Annual IEEE/ACM International Symposium on Microarchitecture Workshops, 2012, pp. 24-31, doi: 10.1109/MICROW.2012.14. (Year: 2012) (8pgs).

IEEE, "IEEE Standard for Discovery, Authentication, and Authorization in Host Attachments of Storage Devices," in IEEE Std 1667-2018 (Revision of IEEE Std 1667-2015), vol. no., pp. 1-226, Oct. 2, 2018, doi: 10.1109/IEEESTD.2018.8479380. (Year: 2018) (226pgs).

Desuert et al., "PUF-Based Protocol for Securing Constrained Devices," 2021 17th International Conference on Intelligent Environments (IE), 2021, pp. 1-8, doi: 10.1109/1 E51775.2021.9486492. (Year: 2021) (8pgs).

\* cited by examiner

1700

ACCESS ENFORCEMENT THROUGH AUTHENTICATION VERIFICATION ENTITY (AVE)

BACKGROUND

A. Technical Field

The present disclosure relates generally to information handling systems and networking. More particularly, the present disclosure relates to controlling access, such as via zoning, between information handling systems in a network.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Fibre Channel (FC) storage area network (SAN) zoning allows a SAN administrator to control communication between host and storage interfaces by grouping them into one or more zones. Zones may be created for a number of reasons—including to increase network security and to prevent data loss or data corruption—by controlling access between devices or user groups. Once in a zone, the interfaces, which may be referred to as zone members, are able to communicate with one another.

Currently, there are two main forms of zoning, soft zoning and hard zoning. For soft zoning, zoning information, typically defined by an administrator, is used to identify and facilitate forming of zones. However, soft zoning does not prevent a host from connecting to a subsystem that it should not connect with because the zoning connections are not enforced by the network. To enforce a zoning configuration, hard zoning may be used. Hard zoning is a technique in which the network switches inspect packets to ascertain if a packet should be forwarded or discarded, according to the communication between nodes allowed by the zoning configuration. In order for the network switches to be able to perform this packet-by-packet filtering, zoning information must be sent to the network switches. However, current approaches involve sending duplicate data to switches. These approaches are very inefficient and cumbersome.

Regardless of the access control mechanism (i.e., soft or hard zoning), traditionally the relationships between the relevant elements of the NVMe entities had to be configured on the switches; and typically, this has been done via a fabric management application or switch element manager in order to configure these relationships explicitly. However, this zoning process places a significant burden on users, particularly if the network is large, changes frequently, or both.

Accordingly, it is highly desirable to find new, more efficient ways to provide access controls, such as facilitating proper access of a hosts to an appropriate subsystem interface.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
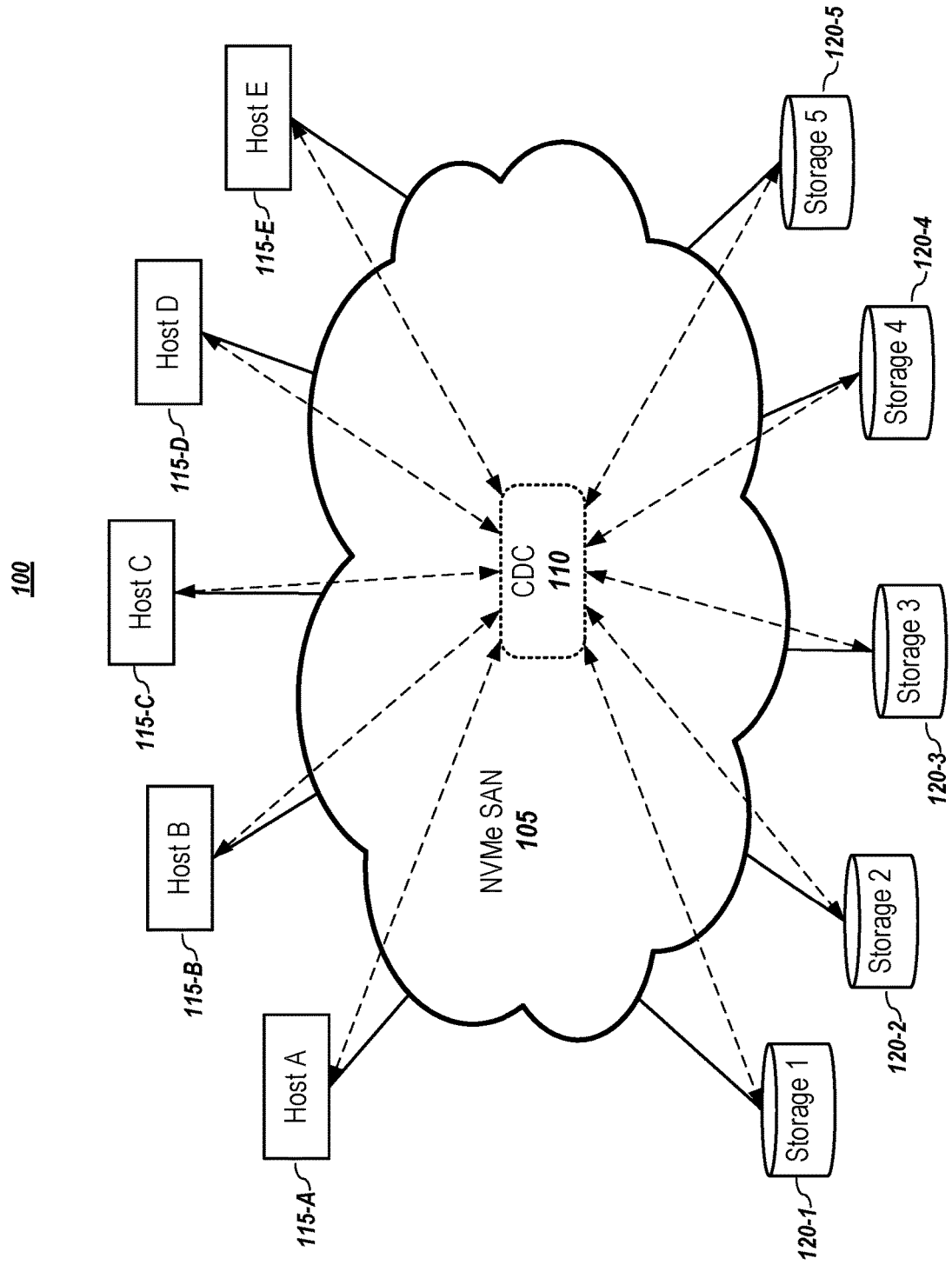
FIG. 1 ("FIG. 1") depicts an NVMe™-over-Fabric (NVMe-oF™) storage area network (SAN).

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of zoning, NVMe environments, and SANs, aspects of the present disclosure are not so limited. Accordingly, the aspects of the present disclosure may be applied or adapted for use in other contexts.

A. General Background

NVM Express® (NVMe®) is a specification that defines how a host communicates with a non-volatile memory, which may be referred to as a subsystem, a storage subsystem, or a storage. One of the specification, TP 8010, specifies how an NVMe™-over-Fabric (NVMe-oF™) network fabric with a centralized discovery controller (CDC) is able to support access control rules through zoning.

Consider, by way of illustration, the NVMe-oF™ SAN 105 with a CDC 110 as depicted in FIG. 1. Note that the various NVMe entities (i.e., hosts 115 and subsystems 120) can access information related to zoning, which is stored centrally at the CDC 110.

Figure 2:
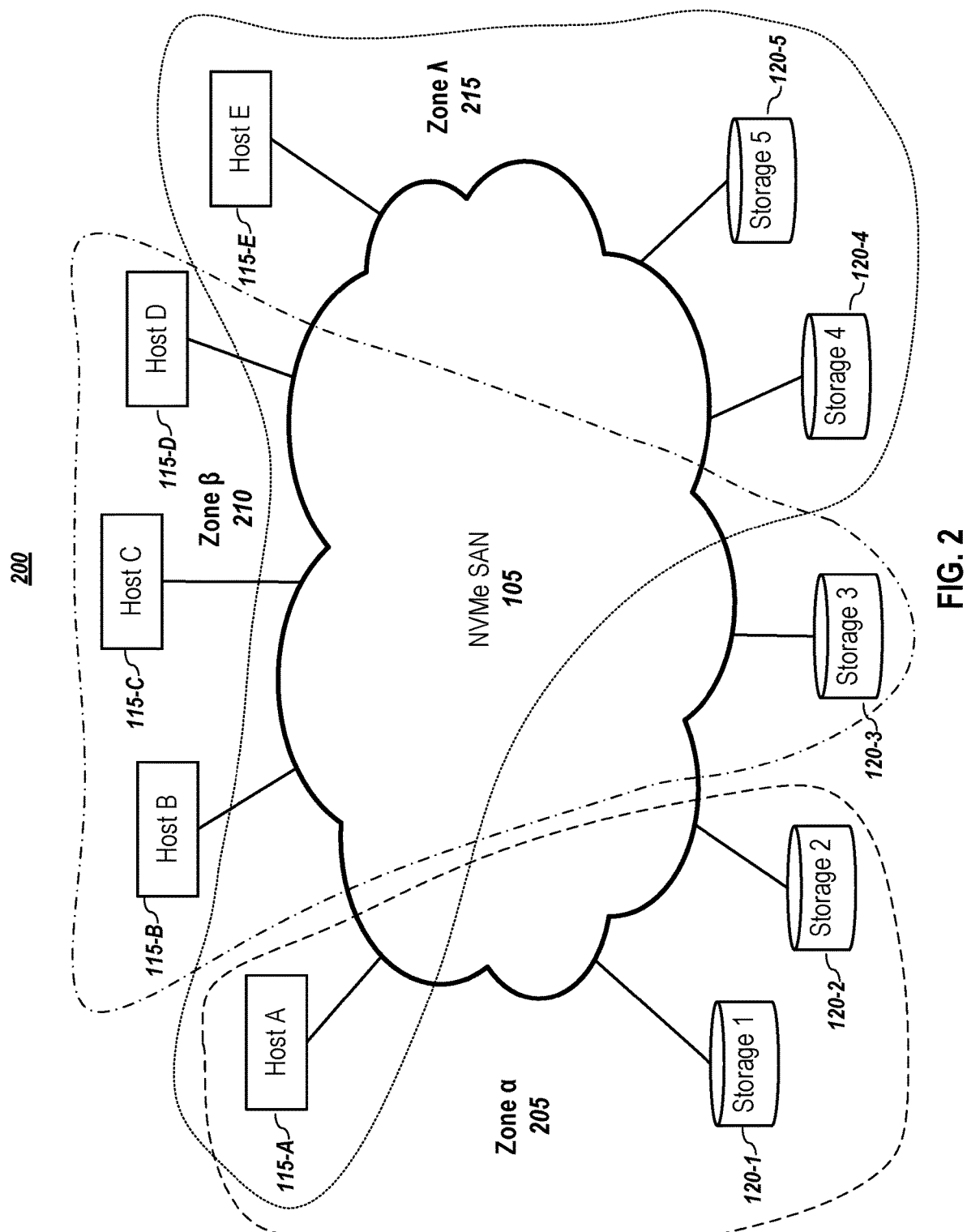
FIG. 2 shows an example of a zone configuration, defined on the CDC by the zone group shown in TABLE 1.

In the depicted example, zone groups and zones are defined on the CDC 110, which are a compact way to express which hosts (i.e., 115) can access which storage subsystems (i.e., 120). FIG. 2 shows an example of a zone configuration, defined on the CDC by the zone group shown in TABLE 1.

TABLE 1

Example Zone Definitions
ZoneGroup
{Rome, NON(CDC)}

| Zone Name | α (205) | γ (210) | λ (215) |
|---|---|---|---|
| Zone Members | {Host A, host} (115-A) | {Host B, host} (115-B) | {Host A, host} (115-A) |
| | {Storage 1, subsystem} (120-1) | {Host C, host} (115-C) | {Host E, host} (115-E) |
| | {Storage 2, subsystem} (120-2) | {Host D, host} (115-D) | {Storage 4, subsystem} (120-4) |
| | — | {Storage 3, subsystem} (120-3) | {Storage 5, subsystem} (120-5) |
| Zone Attributes | None | None | None |

Figure 3:
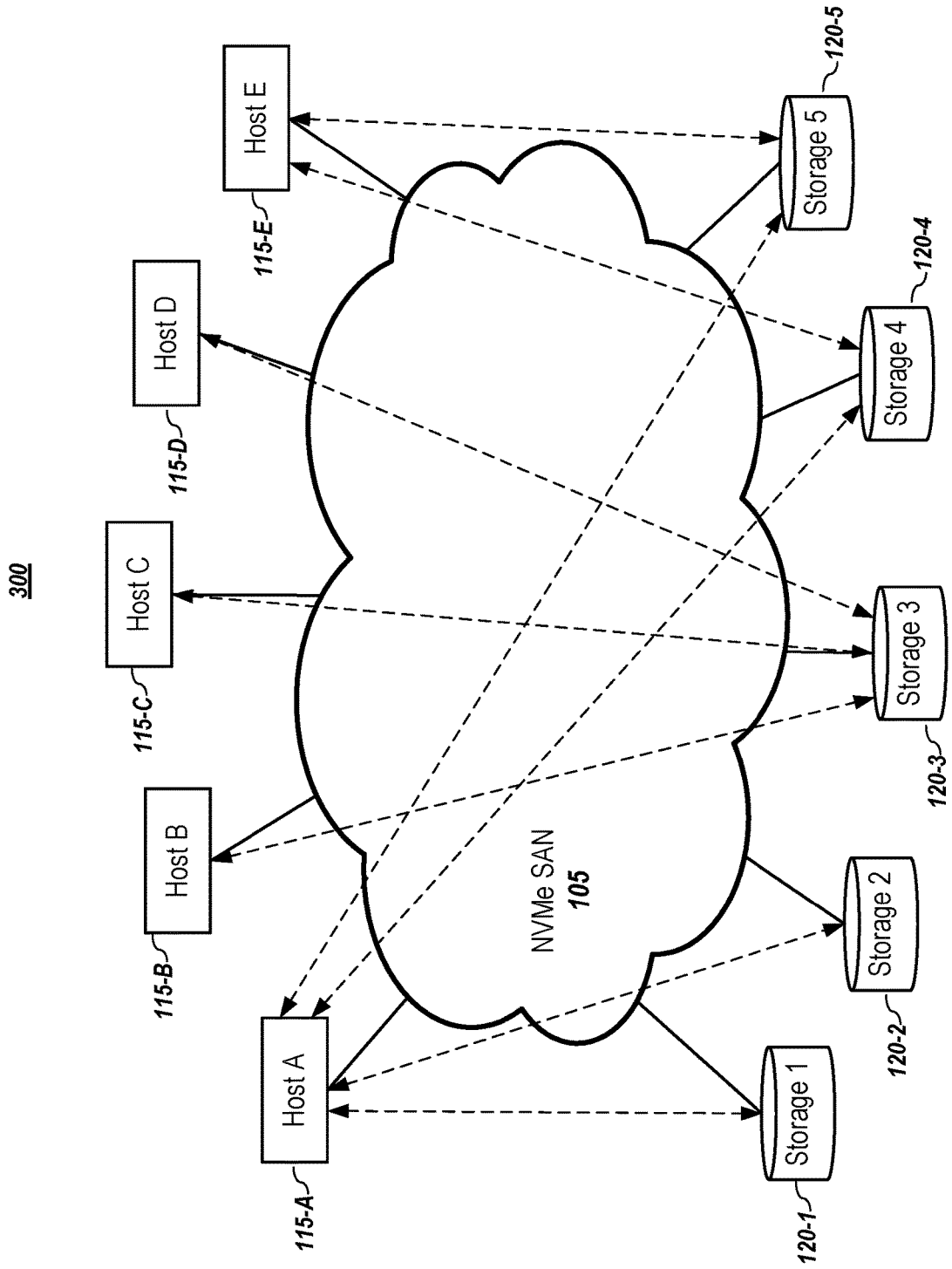
FIG. 3 graphically depicts the allowed connections according to the zone definitions in TABLE 1.

The zone configuration in TABLE 1 allows the connections between the hosts 115 and the subsystems 120 as shown in FIG. 3. The dashed lines represent the connections between the hosts 115 and the subsystems 120, according to the zone configuration of TABLE 1.

After a zone configuration has been defined on the CDC, one of the remaining problems is how to enforce that zone configuration on the network. As discussed above, a straightforward way is soft zoning. When hosts query the CDC to discover the available subsystems in a fabric through a Get Discovery Log Page command, the CDC returns to each host only the list of subsystems the host is allowed to access according to the zoning configuration. As an example, referring to FIG. 3, the CDC (not illustrated in FIG. 3) will respond to Host C 115-C with just Subsystem 3 120-3, because that is the only subsystem that Host C is allowed to access according to the Zoning configuration specified in Table 1. Soft zoning is not able to prevent a host from accessing a subsystem that the host is not supposed to access. Referring to FIG. 3, if Host C 115-C is able to obtain the addressing information of subsystem 4 120-4, Host C 115-C is able to connect to it.

Figure 4:
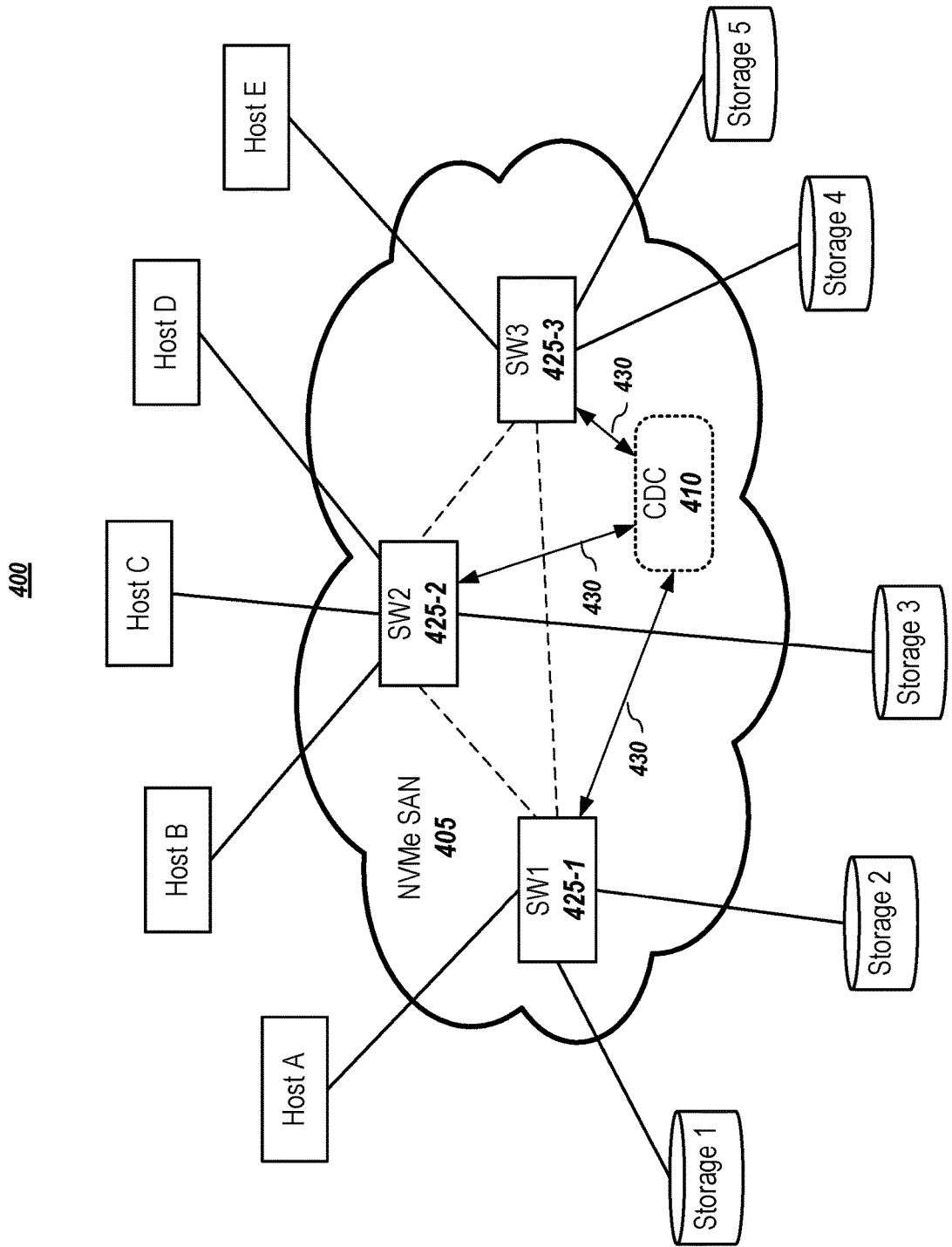
FIG. 4 graphically depicts a network with a centralized discovery controller (CDC) and switches, which are configured to support hard zoning.

Hard zoning is a solution to this issue. Consider, by way of illustration, the network depicted in FIG. 4. With hard zoning enforcement, the CDC 410 is able to communicate 430 access control information to the switches 425-x that form the NVMe SAN 405, as shown in FIG. 4. It should be noted that the CDC may communicate other information than access control information and may communicate information to other entities in the network. The switches are then able to enforce strict access control rules through Access Control Lists (ACL) (e.g., port ACLs). Because hard zoning employs the switches of a fabric to enforce the zoning, it requires coordination and this coordination can be difficult to achieve—especially for a multi-vendor fabric, in which each switch may have different levels of features support. Furthermore, some customers dislike, for security and other reasons, granting the CDC access to their switches.

Thus, a mechanism or mechanisms that are able to provide a stronger zoning enforcement than soft zoning without the difficulties associated with hard zoning would be extremely valuable.

B. Embodiments for Access Enforcement Using an Authentication Verification Entity (AVE)

Figure 5:
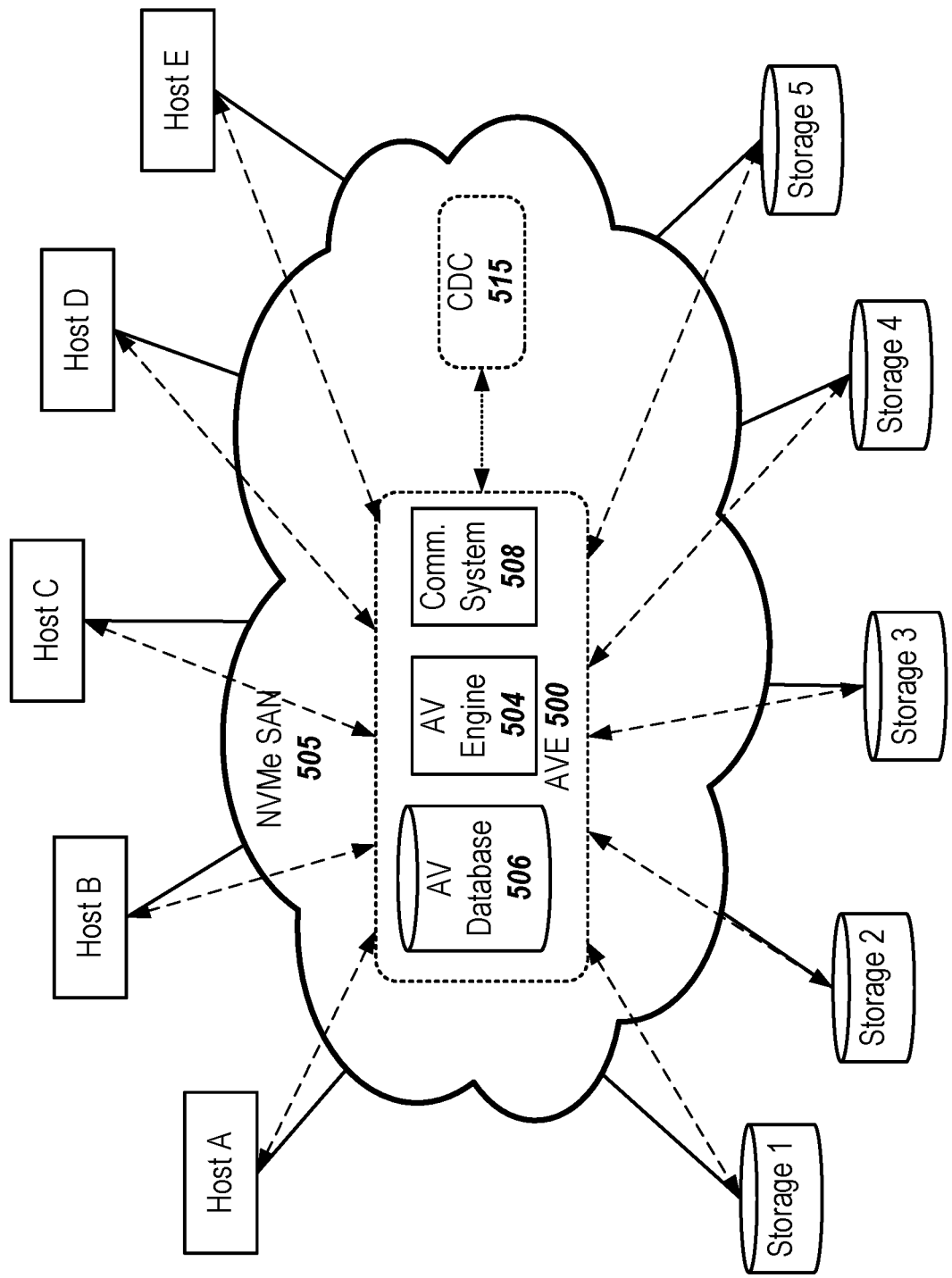
FIG. 5 depicts an Authentication Verification Entity (AVE) in a network fabric, according to embodiments of the present disclosure.

Fabrics provisioned for authentication using the Diffie-Hellman-Hash-Based Message Authentication Codes-Challenge-Handshake-Authentication-Protocol (DH-HMAC-CHAP) protocol with an Authentication Verification Entity (AVE) have an opportunity to provide a stronger zoning enforcement than soft zoning by causing authentication to fail if communication between a host and a subsystem pair is disallowed by zoning. An AVE contains a centralized database typically comprising {NVMe Qualified Name (NQN), Key} pairs for the NVMe hosts and subsystems, for which the AVE is able to perform authentication processing. Like a CDC 515, an AVE 500 is accessed by hosts and subsystems of a fabric, as shown in FIG. 5. In this depicted example, the AVE 500 maintains a database or data store 506 of {NQN, Key} records:

$\{NQN_{H-A}, K_{H-A}\}$
$\{NQN_{H-B}, K_{H-B}\}$
...
$\{NQN_{H-E}, K_{H-E}\}$
$\{NQN_{S-1}, K_{S-1}\}$
$\{NQN_{S-2}, K_{S-2}\}$
...
$\{NQN_{S-5}, K_{S-5}\}$

In one or more embodiments, the authentication verification entity 500 may be provided by or implemented using an information handling system (embodiments of which are discussed below) and/or may include some or all of the components of an information handling system, and in the specific examples below is described as being provided by a dedicated server device. However, in other embodiments, an authentication verification entity 500 may be provided by and/or included in one or more of the NVMe subsystems, may be provided by and/or included in the NVMe host device, and/or provided by and/or included in one or more networking devices (e.g., switch devices) that provide the network fabric. Furthermore, while illustrated and discussed as being provided by a variety of different devices/locations in the network system, one of skill in the art in possession of the present disclosure will recognize that the functionality of the authentication verification entity 500 discussed below may be provided by other devices in the network system that are configured to operate similarly as the authentication verification entity 500 discussed below.

In the illustrated embodiment, the authentication verification entity 500 includes a chassis that houses the components of the authentication verification entity 500, only some of which are illustrated below. For example, the AVE 500 may comprise a processing system and a memory system that is coupled to the processing system and that includes instructions that, when executed by the processing system, cause the processing system to provide an authentication verification engine 504 that is configured to perform the functionality of the authentication verification engines and/or authentication verification entities discussed herein, including checking for access or zoning authorization. Like the CDC, the AVE may be implemented in a dedicated information handling system chassis, may be distributed in a number of information handling systems, may be included with an NVMe subsystem, may be included with a NVMe host device, and/or may be included in one or more other devices in the network. In one or more embodiments, the AVE 500 or the AV engine 504 may be included in a container or Virtual Machine. One of skill in the art shall appreciate that the functionality of the authentication verification entity may be provided in a variety of manners that fall within the scope of the present disclosure as well.

The AVE 500 may include one or more memories (or storage systems) that include an authentication verification database 506 that is configured to store information utilized by the authentication verification engine 504. The AVE 500 may also include a communication system 508 that is coupled to the authentication verification engine 504 (e.g., via a coupling between the communication system 508 and the processing system) and that may be provided by a Network Interface Controller (NIC), wireless communication systems (e.g., BLUETOOTH®, Near Field Communication (NFC) components, WiFi components, 5G wireless components, etc.), and/or any other communication components that would be apparent to one of skill in the art in possession of the present disclosure. However, while a specific AVE 500 has been illustrated and described, one of skill in the art in possession of the present disclosure will recognize that authentication verification entities may include a variety of components and/or component configurations for providing conventional authentication verification functionality, as well as the functionality discussed below, while remaining within the scope of the present disclosure as well.

Figure 6:
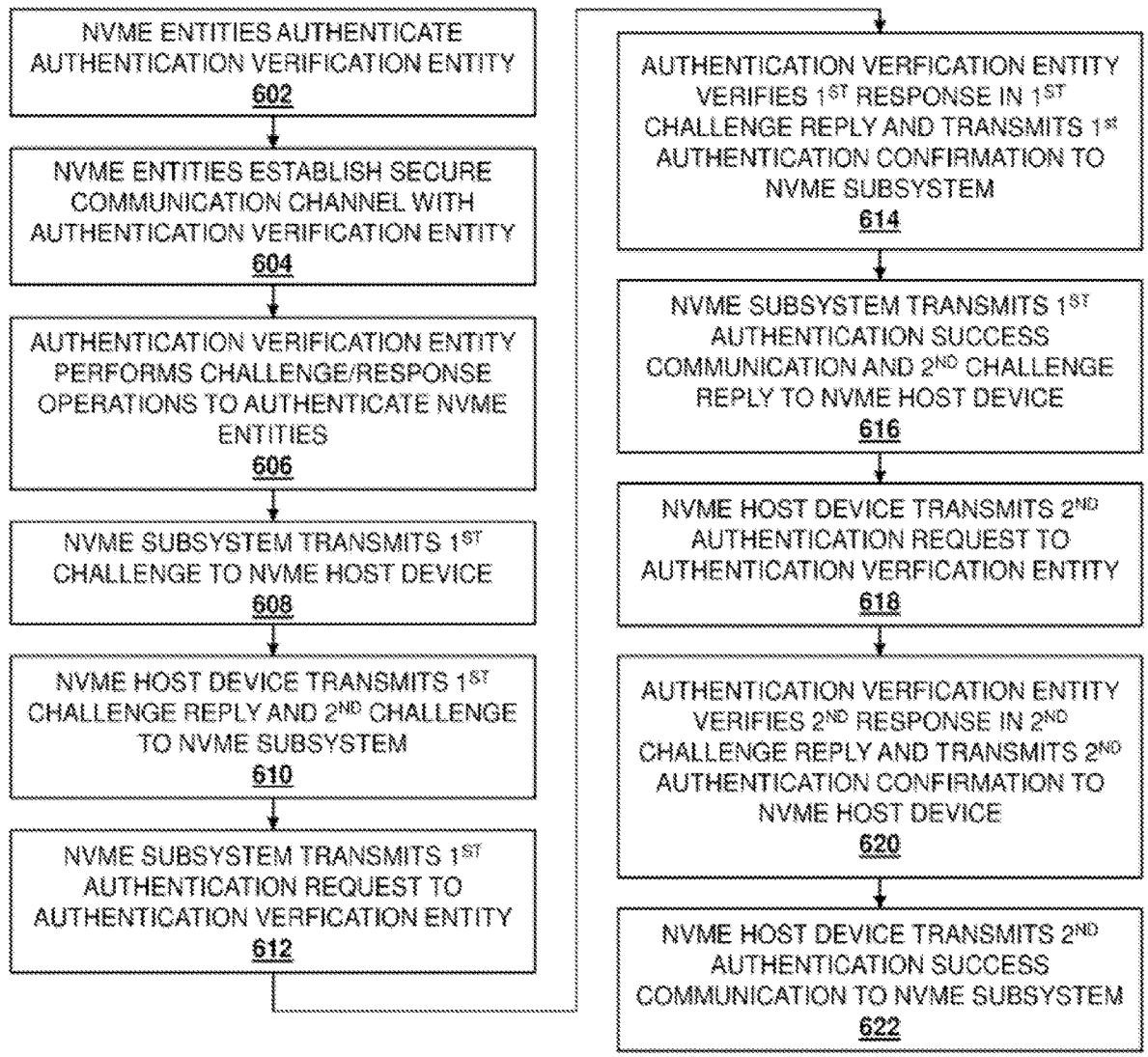
FIG. 6 is a flow chart illustrating an embodiment of a method for performing NVMe-oF™ authentication, according to embodiments of the present disclosure.

An embodiment of a method, depicted in FIG. 6, for performing NVMe-oF™ authentication is presented below. As discussed below, the systems and methods of the present disclosure provide a centralized authentication verification entity that operates to offload authentication verification operations from NVMe entities in the NVMe-oF™ system, which allows the NVMe entities to be provisioned with their associated secret utilized in authentication operations, thus providing a scalable NVMe-oF™ authentication system. For example, the NVMe-oF™ authentication system of the present disclosure may include an authentication verification entity coupled to an NVMe subsystem and an NVMe host device, with the NVMe subsystem coupled to the NVMe host device.

In one or more embodiments, the NVMe subsystem transmits a first challenge to the NVMe host device and, in response, receives a first challenge reply from the NVME host device. The NVMe subsystem may then generate a first authentication verification request communication that includes a first response that was provided in the first challenge reply by the NVMe host device using a first instance of a first secret that is stored in the NVMe host device, and transmits the first authentication verification request communication to the authentication verification entity. In one or more embodiments, the authentication verification entity receives the first authentication verification request communication, verifies the first response using a second instance of the first secret that is stored in the authentication verification entity and, in response, transmits a first authentication verification response communication to the NVMe subsystem. As discussed below, the operations described above may be performed via secure communication channels that are established between the authentication verification entity and each NVMe entity without relying on a single, common shared secret or public key certificates, thus providing scalable and manageable NVMe-oF™ authentication configuration operations for individual entity authentication that are linearly scalable (i.e., requiring only one secret be provided on each NVMe entity, with the authentication verification entity being the only location where all the NVMe entity secrets are stored).

In one or more embodiments, a method 600 begins at block 602 where NVMe entities authenticate an authentication verification entity. As will be appreciated by one of skill in the art in possession of the present disclosure, the operations described below at blocks 602, 604 and 606 operate to establish secure communications channels between the authentication verification entity 500 and each of the NVMe entities in a network system, and the different NVMe entities discussed below (e.g., the NVMe subsystem and the NVMe host device) may perform the operations described below with regard to blocks 602, 604, and 606 concurrently while remaining within the scope of the present disclosure. Furthermore, one of skill in the art in possession of the present disclosure will recognize that the NVMe subsystem may perform blocks 602-606 before proceeding to block 608, while the NVMe host device may perform blocks 602-606 before proceeding to block 610.

One of skill in the art in possession of the present disclosure will recognize that it is desirable (for security reasons) for the NVMe entity/authentication verification entity communications performed at blocks 612 and 618 discussed below to include integrity protections and confidentiality because, for example, they may include challenge/response pairs (e.g., for Hashed Media Access Control-Challenge Handshake Authentication Protocol (HMAC-CHAP) portions of Diffie-Hellman-HMAC-CHAP (DH-HMAC-CHAP) operations in the examples below). As will be appreciated by one of skill in the art in possession of the present disclosure, the establishment of secure communications channels for the NVMe entity/authentication verification entity communications is needed to that prevent an unauthorized user from tampering with the security critical information transmitted as part of these operations, or from learning and using that information in order to bypass the DH portion of the DH-HMAC-CHAP operations discussed below and enable an offline attack against the authentication secrets utilized as discussed below.

Furthermore, one of skill in the art in possession of the present disclosure will recognize how the specific examples of the operations described below at blocks 602, 604, and 606 operate to create "lightweight" secure communications channels between the authentication verification entity 500 and each of the NVMe entities in the network system in a manner that addresses issues associated with a single, common shared secret or public certificate. As will be appreciated by one of skill in the art in possession of the present disclosure, a single, common shared secret approach is associated with issues such as the possible compromise of a single NVMe entity that allows an unauthorized user to acquire its corresponding secret, access the authentication verification entity 500, and attempt to guess the NVMe secrets for other NVMe entities that are stored in the authentication verification entity 500.

As will be appreciated by one of skill in the art in possession of the present disclosure, blocks 602 to 606 are performed to allow an NVMe entity to authenticate and establish a lightweight secure channel with the authentication verification entity, which can be achieved in two ways: bidirectional authentication or mutual authentication. When the secure channel between the NVMe entity and the authentication verification entity is established through bidirectional authentication, each NVMe entity may be provided with the public key of the authentication verification entity, and that public key may be used to authenticate the authentication verification entity at block 602 and establish the secure channel at block 604, with the authentication verification entity authenticating the NVMe entity through a challenge/response operation at block 606. However, when the secure channel with the authentication verification entity is established through mutual authentication, each NVMe entity may be provided with a Pre-Shared Key (PSK) specific for that NVMe entity, with the PSK used to mutually authenticate the NVMe entity and the authentication verification entity at block 602 and to establish the secure channel at block 604. As such, block 606 may be omitted when the secure channel between the NVMe entity and the authentication verification entity is established through mutual authentication.

Figure 7A:
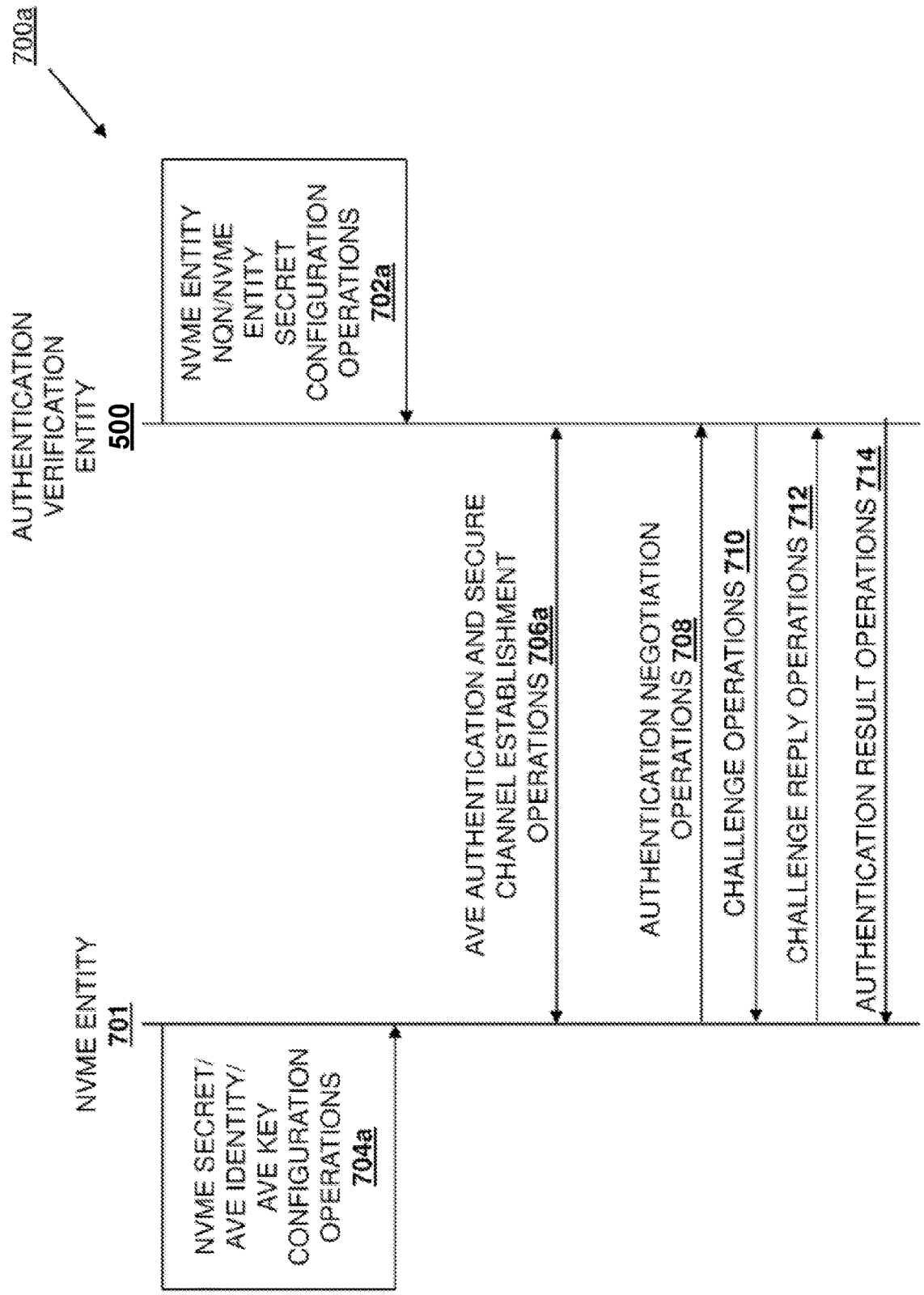
FIGS. 7A & 7B are ladder diagrams illustrating embodiments of the NVMe entity and an authentication verification entity operating during the method of FIG. 6, according to embodiments of the present disclosure.
Figure 7B:
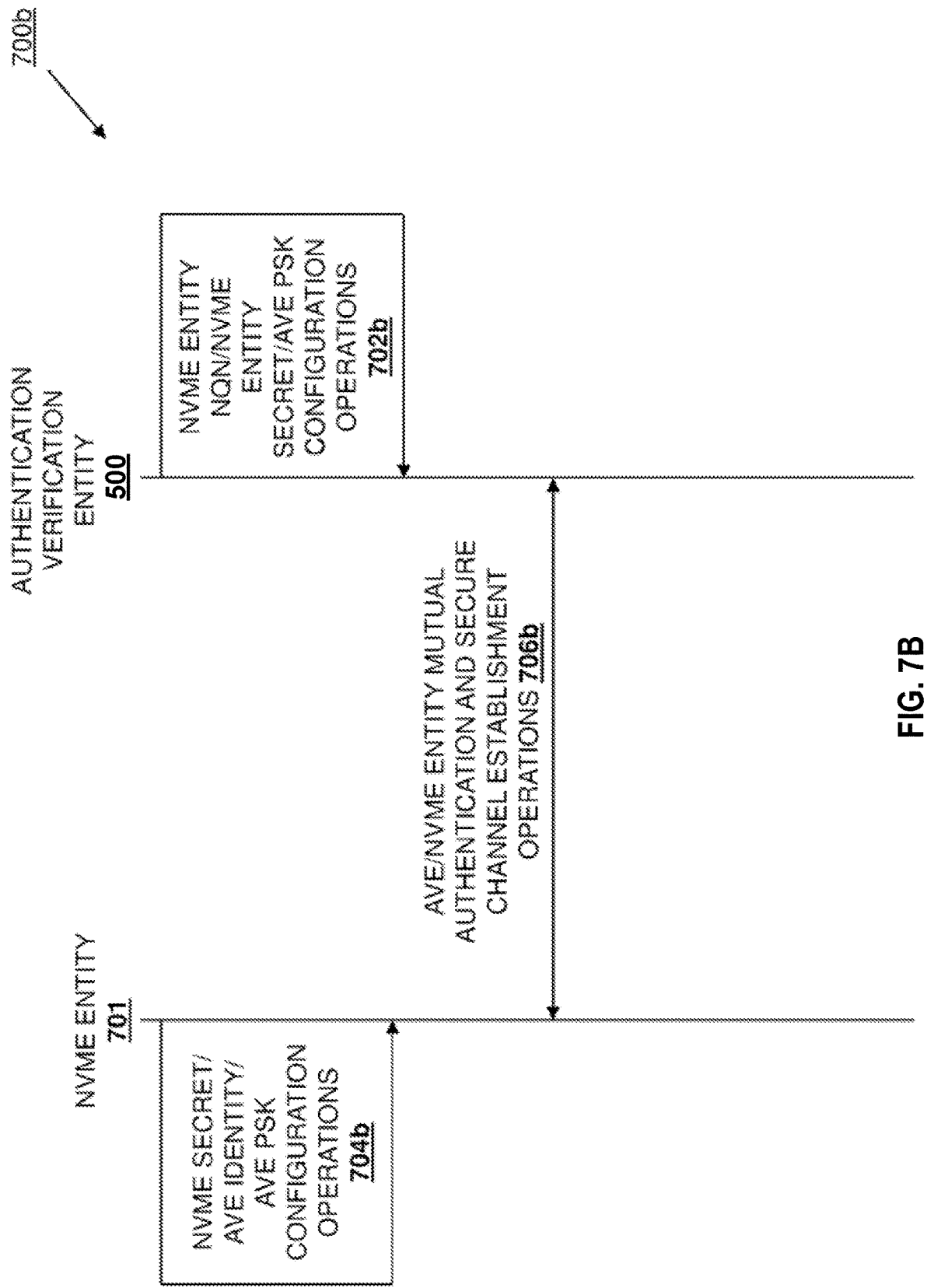

With reference to FIGS. 7A and 7B, NVMe entity/Authentication Verification Entity (AVE) authentication operations 700a and 700b are illustrated in a ladder diagram that identifies operations performed by the AVE 500 and an NVMe entity 701 that may be provided by any of the NVMe subsystems, or the NVMe host device, in the examples provided herein.

As illustrated in FIG. 7A, prior to the method 600, NVMe subsystem NVMe Qualified Name (NQN)/NVMe subsystem secret configuration operations 702a may be performed on the authentication verification entity 500. In an embodiment, the NVMe subsystem NQN/NVMe subsystem secret configuration operations 702a may include a network administrator or other user providing an identification of the NVMe entity 701 in the authentication verification entity 500 using an NVMe subsystem NQN which may be stored in the authentication verification database 506 and which one of skill in the art in possession of the present disclosure will recognize is used in the NVMe-oF™ protocol to uniquely identify NVMe hosts and subsystems (e.g., the NVMe entity 701 in some of the examples below). Furthermore, the NVMe subsystem NQN/NVMe subsystem secret configuration operations 702a may also include the network administrator or other user providing a secret (e.g., a DH-HMAC-CHAP secret) associated with the NVMe entity 701 in the authentication verification entity 500, which may be stored in the authentication verification database 506 as well.

As also illustrated in FIG. 7A, during or prior to the method 600, NVMe secret/AVE identity/AVE key configuration operations 704a may be performed on the NVMe entity 701. In an embodiment, the NVMe secret/AVE identity/AVE key configuration operations 704a may include a network administrator or other user providing the secret (e.g., a DH-HMAC-CHAP secret) discussed above that is associated with the NVMe entity 701 in the NVMe entity 701, which may be stored in a NVMe subsystem database in the NVMe subsystem that provides an NVMe entity in the examples below, in the host database in the NVMe host device that provides an NVMe entity in the examples below, and/or in a database included in any other NVMe entity that operates as part of the NVMe-oF™ authentication system described herein. Furthermore, the NVMe secret/AVE identity/AVE key configuration operations 704a may include a network administrator or other user providing an identity of the authentication verification entity 500 in the NVMe entity 701, which may be stored in the NVMe subsystem database in the NVMe subsystem that provides an NVMe entity in the examples below, in a host database in the NVMe host device that provides an NVMe entity in the examples below, and/or in a database included in any other NVMe entity that operates as part of the NVMe-oF™ authentication system described herein. In a specific example, the identity of the authentication verification entity 500 may be provided by an NQN associated with the AVE 500, a Domain Name System (DNS) name associated with the authentication verification entity 500, and/or other authentication verification entity identifiers that would be apparent to one of skill in the art in possession of the present disclosure.

Further still, the NVMe secret/AVE identity/AVE key configuration operations 704a and 704b may also include a network administrator or other user providing a public key associated with the authentication verification entity 500 in the NVMe entity 701, which may be stored in the NVMe subsystem database in the NVMe subsystem that provides an NVMe entity in the examples below, in the host database in the NVMe host device that provides an NVMe entity in the examples below, and/or in a database included in any other NVMe entity that operates as part of the NVMe-oF™ authentication system described herein. As will be appreciated by one of skill in the art in possession of the present disclosure, the public key associated with the authentication verification entity 500 may be paired with a private key stored in the authentication verification entity 500, and allows signatures provided using that private key to be used to verify the authenticity of the authentication verification entity 500.

In a specific example, Secure Shell (SSH) techniques may be utilized to generate the public/private key pair discussed above (e.g., via "ssh-keygen" operations), store the private key in the authentication verification entity 500, and provide the public key to the NVMe entity 701. However, another option may include the utilization of user-generated self-signed certificates, which may include replacing the public key discussed above with a hash fingerprint of the self-signed-certificate associated with the authentication verification entity 500.

As also discussed below, the bi-directional authentications techniques discussed above (using public/private key techniques and DH-HMAC-CHAP techniques to perform authentication between the authentication verification entity and the NVMe entities) may be replaced by mutual authentication techniques that provide a shared secret (e.g., an authentication verification entity PSK) between each NVMe entity 701 and the authentication verification entity 500 (while still providing linear scalability) while remaining within the scope of the present disclosure as well. In this case the authentication verification database 506 may maintain the authentication verification entity PSK that is configured in conjunction with the NQN and secret for the NVMe entity, as shown in FIG. 7B.

As illustrated in FIG. 7B, prior to the method 600, NVMe subsystem NVMe Qualified Name (NQN)/NVMe subsystem secret/AVE PSK configuration operations 702b may be performed on the authentication verification entity 500. In an embodiment, the NVMe subsystem NQN/NVMe subsystem secret configuration operations 702b may include a network administrator or other user providing an identification of the NVMe entity 701 in the authentication verification entity 500 using an NVMe subsystem NQN which may be stored in the authentication verification database 506 and which one of skill in the art in possession of the present disclosure will recognize is used in the NVMe-oF™ protocol to uniquely identify NVMe hosts and subsystems (e.g., the NVMe entity 701 in some of the examples below). Furthermore, the NVMe subsystem NQN/NVMe subsystem secret configuration operations 702*b* may also include the network administrator or other user providing a secret (e.g., a DH-HMAC-CHAP secret) associated with the NVMe entity 701 in the authentication verification entity 500, which may be stored in the authentication verification database 506 as well. Furthermore, the NVMe subsystem NQN/NVMe subsystem secret configuration operations 702*b* may also include the network administrator or other user providing a PSK (e.g., an AVE PSK) associated with both the NVMe entity 701 and the authentication verification entity 500, which may be stored in the authentication verification database 506 as well.

As also illustrated in FIG. 7B, during or prior to the method 600, NVMe secret/AVE identity/AVE PSK configuration operations 704*b* may be performed on the NVMe entity 701. In an embodiment, the NVMe secret/AVE identity/AVE PSK configuration operations 704*b* may include a network administrator or other user providing the secret (e.g., a DH-HMAC-CHAP secret) discussed above that is associated with the NVMe entity 701 in the NVMe entity 701, which may be stored in the NVMe subsystem database in the NVMe subsystem that provides an NVMe entity in the examples below, in the host database in the NVMe host device that provides an NVMe entity in the examples below, and/or in a database included in any other NVMe entity that operates as part of the NVMe-oF™ authentication system described herein. Furthermore, the NVMe secret/AVE identity/AVE PSK configuration operations 704*a* may include a network administrator or other user providing an identity of the authentication verification entity 500 in the NVMe entity 701, which may be stored in the NVMe subsystem database in the NVMe subsystem that provides an NVMe entity in the examples below, in the host database in the NVMe host device that provides an NVMe entity in the examples below, and/or in a database included in any other NVMe entity that operates as part of the NVMe-oF™ authentication system described herein. In a specific example, the identity of the authentication verification entity 500 may be provided by an NQN associated with the AVE 500, a Domain Name System (DNS) name associated with the authentication verification entity 500, and/or other authentication verification entity identifiers that would be apparent to one of skill in the art in possession of the present disclosure.

Further still, the NVMe secret/AVE identity/AVE PSK configuration operations 704*b* may also include a network administrator or other user providing a PSK associated with both the authentication verification entity 500 and the NVMe entity 701 in the NVMe entity 701, which may be stored in the NVMe subsystem database in the NVMe subsystem that provides an NVMe entity in the examples below, in the host database in the NVMe host device that provides an NVMe entity in the examples below, and/or in a database included in any other NVMe entity that operates as part of the NVMe-oF™ authentication system described herein.

As illustrated in FIGS. 7A and 7B, the NVMe entity 701 and the authentication verification entity 500 may perform AVE authentication and secure channel establishment operations 706*a* and AVE/NVMe entity mutual authentication and secure channel establishment operations 706*b*. For example, in an embodiment of block 602, the AVE authentication and secure channel establishment operations 706*a* may include the NVMe entity 701 authenticating the authentication verification entity 500. Continuing with the specific example provided above, at block 602, the NVMe entity 701 may use the identifier for the authentication verification entity 500 and the public key associated with the authentication verification entity 500 to authenticate the authentication verification entity 500, and one of skill in the art in possession of the present disclosure will recognize how the public key associated with the authentication verification entity 500 may be utilized to check/verify a proof/demonstration provided by the authentication verification entity 208 of knowledge of the corresponding private key. However, as discussed above, rather than the NVMe entity 701 using a public key to authenticate the authentication verification entity 500 based on the authentication verification entity's proof/demonstration of knowledge of the corresponding private key, the NVMe entity 701 and authentication verification entity 500 may utilize a PSK to perform a mutual authentication while remaining within the scope of the present disclosure as well, as shown in the AVE/NVMe entity mutual authentication and secure channel establishment operations 706*b* of FIG. 7B.

As will be appreciated by one of skill in the art in possession of the present disclosure, the authentication operations performed at block 602 may be performed between the authentication verification engine 504 in the authentication verification entity 500 and 1) the controller engine 304*a* included in the NVMe subsystem 202*a*/300 that provides the NVMe entity 701 in the examples below, 2) the host engine 404 in the NVMe host device 206/400 that provides the NVMe entity 701 in the examples below, or 3) similar engines in any other NVMe entity that operates as part of the NVMe-oF™ authentication system described herein.

The method 600 then proceeds to block 604 where the NVMe entities establish secure communication channels with the authentication verification entity. In an embodiment, at block 604, the AVE authentication and secure channel establishment operations 706*a* and 706*b* may include the NVMe entity 701 establishing a communication channel with the authentication verification entity 500. As such, at block 604 and in response to authenticating the authentication verification entity 500, the NVMe entity 701 may establish a secure communications channel with the authentication verification entity 500. In a specific example, the secure communication channel with the authentication verification entity 500 may be provided by a datagram service (e.g., with no need to track a connection state), and the establishment of the secure communications channel between the NVMe entity 701 and the authentication verification entity 500 may include the use of the Datagram Transport Layer Security (DTLS) protocol to establish a DTLS secure communications channel. However, while a specific example is provided, one of skill in the art in possession of the present disclosure will appreciate that other protocols may be used at block 604 to establish secure communications channels while remaining within the scope of the present disclosure as well.

As will be appreciate by one of skill in the art in possession of the present disclosure, the secure communications channel establishment operations performed at block 604 may be performed between the authentication verification engine 504 in the authentication verification entity 500 and 1) a controller engine in the NVMe subsystem that provides the NVMe entity 701 in the examples below, 2) the host engine in the NVMe host device that provides the NVMe entity 701 in the examples below, or 3) similar engines in any other NVMe entity that operates as part of the NVMe-oF™ authentication system described herein.

In embodiments in which bidirectional authentication is performed as discussed above, the method 600 then proceeds to block 606 where the authentication verification entity performs challenge/response operations to authenticate the NVMe entities. In an embodiment, at block 606 and subsequent to the establishment of the secure communications channel between the NVMe entity 701 and the authentication verification entity 500, the authentication verification engine 504 in the authentication verification entity 500 may perform the challenge/response operations discussed below with 1) the controller engine in the NVMe subsystem that provides the NVMe entity 701 in the examples below, 2) the host engine in the NVMe host device that provides the NVMe entity 701 in the examples below, or 3) similar engines in any other NVMe entity that operates as part of the NVMe-oF™ authentication system described herein.

With reference to FIG. 7A, at block 606 the NVMe entity 701 may perform authentication negotiation operations 708 that include transmitting an authentication negotiation communication to the authentication verification entity 500. In a specific example, the authentication negotiation communication transmitted by the NVMe entity 701 may include the following information:

(T_ID, AuthID, TLS_c, HashIDList, DHgIDList)

As will be appreciated by one of skill in the art in possession of the present disclosure, the "T_ID" component of the authentication negotiation communication in the example above provides a transaction identifier that may be utilized to identify that authentication negotiation communication, the "AuthID" component of the authentication negotiation communication in the example above provides an authentication protocol identifier that may be utilized to identify an authentication protocol for use in the challenge/response operations, the "TLS_c" component of the authentication negotiation communication in the example above provides a secure channel creation identifier that is utilized to identify that a secure channel should not be established in response to successful challenge/response operations (because these operations are performed via the secure channel previously established at block 604), the "HashIDList" component of the authentication negotiation communication in the example above provides a list of secure hash functions that may be utilized in the challenge/response operations, and the "DHgIDList" component of the authentication negotiation communication in the example above provides a list of DH groups that may be utilized in the challenge/response operations to provide enhanced security. Furthermore, while a specific authentication negotiation communication (i.e., a DH-HMAC-CHAP authentication negotiation communication) is described, one of skill in the art in possession of the present disclosure will appreciate that authentication negotiation communications may include other information while remaining within the scope of the present disclosure as well.

With reference to FIG. 7A, at block 606 and in response to receiving the authentication negotiation communication as part of the authentication negotiation operations 708, the authentication verification entity 500 may perform challenge operations 710 that include transmitting a challenge communication to the NVMe entity 710. In a specific example, the authentication verification entity 500 may select parameters for the protocols (e.g., select a HashID from a HashIDList and a DHgID from a DHgIDList in the examples provided herein), and then generate and transmit a challenge communication, and one of skill in the art in possession of the present disclosure will appreciate that the negotiation may fail if the authentication verification entity 500 does not find any of the available/offered IDs acceptable. Thus, in some examples, the challenge communication transmitted by the authentication verification entity 500 may include the following information:

(T_ID, HashID, DHgID, Ia, Ca, gx mod p)

As will be appreciated by one of skill in the art in possession of the present disclosure, the "T_ID" component of the challenge communication in the example above provides a transaction identifier that may be utilized to identify that challenge communication, the "HashID" component of the challenge communication in the example above provides an identification of a hash function for use in the challenge/response operations, the "DHgID" component of the challenge communication in the example above provides an identification of a DH group for use in the challenge/response operations to provide enhanced security, the "Ia" component of the challenge communication in the example above provides a sequence number for use in the challenge/response operations to provide enhanced security, the "C" component of the challenge communication in the example above provides the challenge in the challenge/response operations, and the "gx mod p" component of the challenge communication in the example above provides a DH exponential parameter for use in the challenge/response operations to provide enhanced security where "g" and "p" are parameters of the DH group indicated by the "DHgID" component and "x" is generated by the authentication verification entity. However, while a specific challenge communication (i.e., a DH-HMAC-CHAP challenge communication) is described, one of skill in the art in possession of the present disclosure will appreciate that challenge communications may include other information while remaining within the scope of the present disclosure as well.

With reference to FIG. 7A, at block 606 and in response to receiving the challenge communication as part of the challenge operations 710, the NVMe entity 701 may perform challenge reply operations 712 that include transmitting a challenge reply communication to the authentication verification entity 500. In a specific example, the challenge reply communication transmitted by the NVMe entity 701 may include the following information:

(T_ID, Ra, gy mod p)

As will be appreciated by one of skill in the art in possession of the present disclosure, the "T_ID" component of the challenge reply communication in the example above provides a transaction identifier that may be utilized to identify that challenge reply communication, the "Ra" component of the challenge reply communication in the example above provides the response in the challenge/response operations, and the "gy mod p" component of the challenge reply communication in the example above provides a DH exponential parameter for use in the challenge/response operations to provide enhanced security where "g" and "p" are parameters of the DH group indicated by the "DHgID" component of the challenge communication and "y" is generated by the NVMe entity. Furthermore, one of skill in the art in possession of the present disclosure will appreciate that the response "Ra" may have been generated by the NVMe entity 710 via augmentation of the challenge "Ca" with (gx mod p)y mod p=gxy mod p to create an augmented challenge, along with the performance of the hash function identified in challenge communication on the augmented challenge, the secret associated with and stored in the NVMe entity 701 as discussed above, as well as any other response generation information (e.g., the sequence number "1a" discussed above) known in the art. However, while a specific challenge reply communication (i.e., a DH-HMAC-CHAP challenge reply communication) is described, one of skill in the art in possession of the present disclosure will appreciate that challenge reply communications may include other information while remaining within the scope of the present disclosure as well.

As will be appreciated by one of skill in the art in possession of the present disclosure, in response to receiving the challenge reply communication as part of the challenge reply operations 712, the authentication verification entity 208/300 may verify the response "Ra" included in the challenge reply communication by augmenting the challenge "Ca" with (gy mod p)x mod p=gxy mod p to create an augmented challenge, along with performing the hash function identified in challenge communication on the augmented challenge, the secret associated with the NVMe entity 701 and stored in the authentication verification entity 500 as discussed above, as well as any other response generation information (e.g., the sequence number "1a" discussed above) known in the art. One of skill in the art in possession of the present disclosure will recognize that the result of the performance of that hash function by the authentication verification entity may be compared to the response "Ra" included in the challenge reply communication to determine whether there is a match (e.g., the "challenge result" discussed below), with a match verifying the authenticity of the NVMe entity 701, and no match indicating that the NVMe entity is not authentic.

With reference to FIG. 7A, at block 606 and in response to receiving the challenge reply communication as part of the challenge reply operations 712, the authentication verification entity 500 may perform authentication result operations 714 that include transmitting a challenge result communication to the NVMe entity 710. In a specific example, the authentication result communication transmitted by the authentication verification entity 500 may include the following information:

(T_ID, AuthStatus)

As will be appreciated by one of skill in the art in possession of the present disclosure, the "T_ID" component of the challenge communication in the example above provides a transaction identifier that may be utilized to identify that challenge result communication, and the "AuthStatus" component of the challenge communication in the example above provides an authentication status of the authentication performed during the challenge/response operations (e.g., identifying whether the NVMe entity is authentic or not). However, while a specific challenge result communication (i.e., a DH-HMAC-CHAP challenge result communication) is described, one of skill in the art in possession of the present disclosure will appreciate that challenge result communications may include other information while remaining within the scope of the present disclosure as well.

Thus, following block 606, the NVMe entity 701 may be authenticated by the authentication verification entity 500 to, for example, confirm that the NVMe entity 701 has permission/rights to access the authentication verification entity 500. However, while the method 600 is illustrated and described as performed by NVMe entities that have permission/rights to access the authentication verification entity 500, one of skill in the art in possession of the present disclosure will recognize that NVMe entities that do not have permission/rights to access the authentication verification entity 500 will be prevented from utilizing the authentication verification services provided by the authentication verification entity 500 discussed below. Thus, any of the NVMe subsystems and/or the NVMe host device that are authenticated at block 606 may proceed with the remainder of the method 600 as discussed below, while those that are not authenticated at block 606 will be barred from proceeding with the remainder of the method 600.

Furthermore, while specific challenge/response operations (e.g., DH-HMAC-CHAP operations) are described above, one of skill in the art in possession of the present disclosure will recognize that, because the authentication transaction is performed in the secure communication channel established at block 604 (e.g., a DTLS secure communication channel), the DH portion of the DH-HMAC-CHAP operations could be omitted from block 606 while remaining within the scope of the present disclosure as well. As discussed above and as will be appreciated by one of skill in the art in possession of the present disclosure, the NVMe entity/AVE authentication operations 700 discussed above only require the NVMe entities in the NVMe-oF™ authentication system be configured with linear amounts of information (e.g., providing only one secret per NVMe entity, with each NVMe secret also stored on the authentication verification entity 500).

The method 600 then proceeds to block 608 where an NVMe subsystem transmits a first challenge to an NVMe host device (e.g., the mutual authentication embodiments described herein may skip block 606). In one or more embodiments, at block 608, the controller engine in the NVMe subsystem may transmit a challenge to the NVMe host device. In the specific examples provided below, the NVMe subsystem is described as performing NVMe-oF™ authentication operations with the NVMe host device, but one of skill in the art in possession of the present disclosure will appreciate that the NVMe host device may perform NVMe-oF™ authentication operations with any of the NVMe subsystems in the network system, and any two NVMe entities in the network system may perform NVMe-oF™ authentication operations in a similar manner as well.

Figure 8:
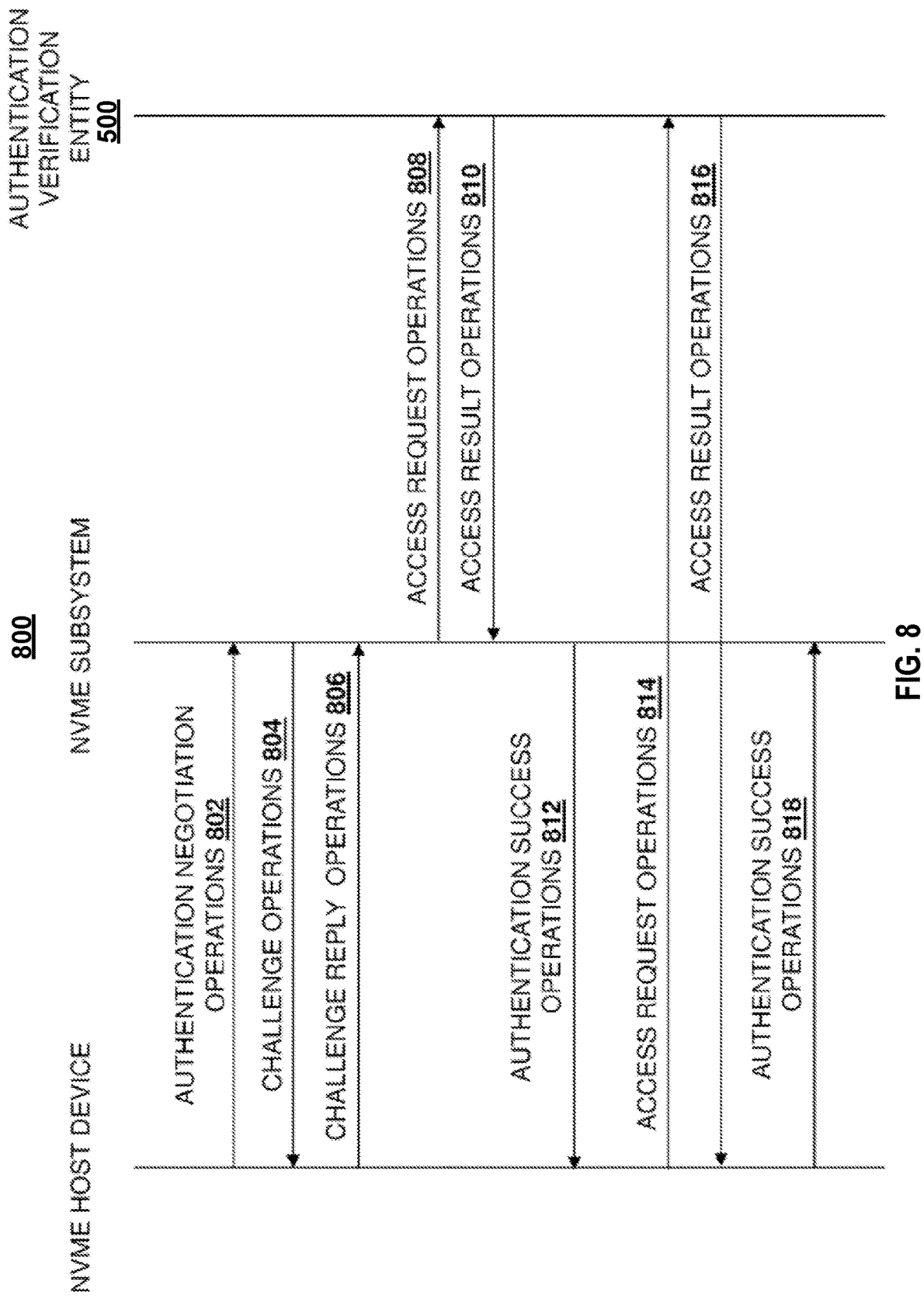
FIG. 8 is a ladder diagram illustrating an embodiment of an NVMe subsystem, an NVMe host, and an authentication verification entity operating during the method of FIG. 6, according to embodiments of the present disclosure.

FIG. 8 provides a ladder diagram that illustrates authentication verification operations 800 performed by the AVE 500, the NVMe subsystem, and the NVMe host device in the examples provided herein. With reference to FIG. 8, during or prior to block 608, the host engine in the NVMe host device may perform authentication negotiation operations 802 that include transmitting an authentication negotiation communication to the NVMe subsystem. In a specific example, the authentication negotiation communication transmitted by the NVMe host device may include the following information:

(T_ID, AuthID, TLS_c, HashIDList, DHgIDList)

As will be appreciated by one of skill in the art in possession of the present disclosure, the "T_ID" component of the authentication negotiation communication in the example above provides a transaction identifier that may be utilized to identify that authentication negotiation communication, the "AuthID" component of the authentication negotiation communication in the example above provides an authentication protocol identifier that may be utilized to identify an authentication protocol for use in the challenge/response operations, the "TLS_c" component of the authentication negotiation communication in the example above provides a secure channel creation identifier that may be utilized to identify that a secure channel should be established in response to successful challenge/response operations, the "HashIDList" component of the authentication negotiation communication in the example above provides a list of secure hash functions that may be utilized in the challenge/response operations, and the "DHgIDList" component of the authentication negotiation communication in the example above provides a list of DH groups that may be utilized in the challenge/response operations to provide enhanced security. However, while a specific authentication negotiation communication (i.e., a DH-HMAC-CHAP authentication negotiation communication) is described, one of skill in the art in possession of the present disclosure will appreciate that authentication negotiation communications may include other information while remaining within the scope of the present disclosure as well.

With reference to FIG. 8, at block 608 and in response to receiving the authentication negotiation communication as part of the authentication negotiation operations 802, the controller engine in the NVMe subsystem may perform challenge operations 804 that include transmitting a challenge communication to the NVMe host device. In a specific example, the controller engine in the NVMe subsystem may select parameters for the protocols (e.g., select a HashID from a HashIDList and a DHgID from a DHgIDList in the examples provided herein), and then generate and transmit a challenge communication, and one of skill in the art in possession of the present disclosure will appreciate that the negotiation may fail if the controller engine in the NVMe subsystem does not find any of the available/offered IDs acceptable. Thus, in some examples, the challenge communication transmitted by the controller engine in the NVMe subsystem may include the following information:

(T_ID, HashID, DHgID, I1, C1, gx mod p)

As will be appreciated by one of skill in the art in possession of the present disclosure, the "T_ID" component of the challenge communication in the example above provides a transaction identifier that may be utilized to identify that challenge communication, the "HashID" component of the challenge communication in the example above provides an identification of a hash function for use in the challenge/response operations, the "DHgID" component of the challenge communication in the example above provides an identification of a DH group for use in the challenge/response operations to provide enhanced security, the "I1" component of the challenge communication in the example above provides a first sequence number for use in the challenge/response operations to provide enhanced security, the "C1" component of the challenge communication in the example above provides the first challenge in the challenge/response operations, and the "gx mod p" component of the challenge communication in the example above provides a DH exponential parameter for use in the challenge/response operations to provide enhanced security where "g" and "p" are parameters of the DH group indicated by the "DHgID" component and "x" is generated by the controller engine. However, while a specific challenge communication (i.e., a DH-HMAC-CHAP challenge communication) is described, one of skill in the art in possession of the present disclosure will appreciate that challenge communications may include other information while remaining within the scope of the present disclosure as well.

The method 600 then proceeds to block 610 where the NVMe host device transmits a first challenge reply and a second challenge to the NVMe subsystem. With reference to FIG. 8, in an embodiment of block 610 and in response to receiving the challenge communication, host engine in the NVMe host device may perform challenge reply operations 806 that include transmitting a challenge reply communication to the NVMe subsystem. In a specific example, the challenge reply communication transmitted by the NVMe host device may include the following information:

(T_ID, R1, gy mod p, [I2, C2])

As will be appreciated by one of skill in the art in possession of the present disclosure, the "T_ID" component of the challenge reply communication in the example above provides a transaction identifier that may be utilized to identify that challenge reply communication, the "R1" component of the challenge reply communication in the example above provides the first response in the challenge/response operations, the "gy mod p" component of the challenge reply communication in the example above provides a DH exponential parameter for use in the challenge/response operations to provide enhanced security where "g" and "p" are parameters of the DH group indicated by the "DHgID" component of the challenge communication and "y" is generated by the NVMe host device, the "I2" component of the challenge reply communication in the example above provides a second sequence number for use in the challenge/response operations to provide enhanced security, and the "C2" component of the challenge communication in the example above provides the second challenge in the challenge/response operations. Furthermore, one of skill in the art in possession of the present disclosure will appreciate that the first response "R1" may have been generated by the host engine 404 in the NVMe host device 206/400 via augmentation of the first challenge "C1" with (gx mod p)y mod p=gxy mod p to create an augmented challenge, along with the performance of the hash function identified in challenge communication on the augmented challenge, the secret associated with and stored in the NVMe host device, as well as any other response generation information (e.g., the first sequence number "I1" discussed above) known in the art. However, while a specific challenge reply communication (i.e., a DH-HMAC-CHAP challenge reply communication) is described, one of skill in the art in possession of the present disclosure will appreciate that challenge reply communications may include other information while remaining within the scope of the present disclosure as well.

In a specific example, the first response "R1" included in the challenge reply communication may be generated by the host engine in NVMe host device by performing an HMAC function (e.g., as specific in IETF RFC 2104) using the hash function (H) identified in the challenge communication, the secret ("Kh") associated with the NVMe host device and stored in the NVMe host device, a first augmented challenge ("Ca1") that is discussed in further detail below, the first sequence number ("I1"), the transaction identifier ("T_ID") that one of skill in the art in possession of the present disclosure will recognize is constant across the sequence of NVMe host device/NVMe subsystem operations illustrated in FIG. 8, and the secure channel creation identifier ("TLS_c") as detailed below:

R1=HMAC(Kh, Ca1||I1||T_ID||TLS_c)

One of skill in the art in possession of the present disclosure will appreciate that additional elements may be included in the list of concatenated parameters that are passed to the HMAC function in order to strengthen the security of the resulting response.

Continuing with this specific example, the first augmented challenge "Ca1" utilized to generate the first response "R1" may be generated by the host engine in NVMe host device by performing the hash function (H) identified in the challenge communication using the first challenge "C1", the DH exponential parameter "gx mod p", and the DH parameter "y", as detailed below:

Ca1=H(C1‖gxy mod p)

One of skill in the art in possession of the present disclosure will appreciate that augmentation of a challenge with gxy mod p may be computed in other manners that will fall within the scope of the present disclosure as well.

As will be appreciated by one of skill in the art in possession of the present disclosure, the host engine in NVMe host device knows "y", and thus may compute (gx mod p)y when it receives gx mod p. Furthermore, the controller engine in NVMe subsystem knows "x", and thus may perform the (gy mod p)x mod p calculation to compute gxy mod p when gy mod p is received from the NVMe host device as gxy mod p=gyx mod p.

The method 600 then proceeds to block 612 where the NVMe subsystem transmits a first authentication verification request to the authentication verification entity. In one or more embodiments, at block 612 and in response to receiving the challenge reply communication, the controller engine in the NVMe subsystem may perform access request operations 808 that include transmitting an access request communication to the authentication verification entity 500. In an embodiment, the access request communication transmitted to the authentication verification entity may contain all the parameters needed by the authentication verification entity in order to perform the verification of the corresponding authentication transaction. In a specific example, the access request communication transmitted by the controller engine in the NVMe subsystem may include the following information:

(ID, NQN1, T_ID, AuthID, TLS_c, HashID, DHgID, I1, Ca1, R1)

As will be appreciated by one of skill in the art in possession of the present disclosure, the "ID" component of the access request communication in the example above provides an access request/result identifier that connects the access requests received by the authentication verification entity 500 with the access results provided by the authentication verification entity 500, the "NQN1" component of the access request communication in the example above provides an identifier for the NVMe host device (e.g., via an NQN associated with the NVMe host device), the "T_ID" component of the access request communication in the example above provides a transaction identifier that may be utilized to identify the authentication transaction that access request communication refers to, the "AuthID" component of the access request communication in the example above provides an authentication protocol identifier that may be utilized to identify an authentication protocol for use in the authentication verification operations, the "TLS_c" component of the access request communication in the example above provides a secure channel creation identifier that may be utilized to identify that a secure channel should be established in response to successful authentication verification operations, the "HashID" component of the access request communication in the example above provides an identification of a hash function for use in the authentication verification operations, the "DHgID" component of the access request communication in the example above provides an identification of a DH group for use in the authentication verification operations to provide enhanced security, the "I1" component of the access request communication in the example above provides a first sequence number for use in the authentication verification operations to provide enhanced security, the "Ca1" component of the access request communication in the example above provides the first augmented challenge in the authentication verification operations, and the "R1" component of the access request communication in the example above provides the first response in the challenge/response operations. However, while a specific access request communication (i.e., a DH-HMAC-CHAP access request communication) is described, one of skill in the art in possession of the present disclosure will appreciate that access request communications may include other information while remaining within the scope of the present disclosure as well.

As will be appreciated by one of skill in the art in possession of the present disclosure, the "DHgID" component of the access request communication in the example above may not be required for the authentication verification operations discussed below, as the computation of the first augmented challenge "Ca1" causes the verification computation to not depend on the DH exchange, but is provided in the access request communication in the example above for completeness, as it may be provided in an authentication verification entity log to record which DH group was used in each authentication verification computation.

The method 600 then proceeds to block 614 where the authentication verification entity verifies a first response in the first challenge reply and transmits a first authentication verification response to the NVMe subsystem. In one or more embodiments, at block 614 and in response to receiving the access request communication as part of the access request operations 808, the authentication verification engine 504 in the authentication verification entity 500 may perform authentication verification operations that include verifying the first response "R1" included in the access request communication by performing the HMAC function using the hash function (H) identified in the access request communication, the secret ("Kh") associated with the NVMe host device and stored in the authentication verification entity 500 as discussed above, the first augmented challenge "Ca1", the first sequence number "I1", the transaction identifier "T_ID" that one of skill in the art in possession of the present disclosure will recognize is constant across the sequence of NVMe host device/NVMe subsystem operations illustrated in FIG. 8, the secure channel creation identifier "TLS_c", and any other parameter relevant to the security computation that was provided in the access request message, as detailed below:

R1=HMAC(Kh, Ca1‖I1‖T_ID‖TLS_c)

One of skill in the art in possession of the present disclosure will recognize that the result of the performance of that HMAC function by the authentication verification entity 208/300 may be compared to the first response "R1" included in the access request communication to determine whether there is a match (e.g., the "AuthStatus" discussed below), with a match verifying the authenticity of the NVMe host device, and no match indicating that the NVMe host device is not authentic.

With reference to FIG. 8, in an embodiment of block 614 and in response to authenticating the NVMe host device, the authentication verification engine 504 in the authentication verification entity 500 may perform access result operations 810 that include transmitting an access result communication to the NVMe subsystem. In a specific example, the access result communication transmitted by the authentication verification entity 500 may include the following information:

(ID, AuthStatus)

As will be appreciated by one of skill in the art in possession of the present disclosure, the "ID" component of the access result communication in the example above provides an access request/result identifier that connects the access result provided by the authentication verification entity 500 with the access request transmitted by the NVMe subsystem, while the "AuthStatus" component provides an authentication status of the authentication operations (e.g., identifying whether the NVMe host is authentic or not). However, while a specific access result communication (i.e., a DH-HMAC-CHAP access result communication) is described, one of skill in the art in possession of the present disclosure will appreciate that access result communications may include other information while remaining within the scope of the present disclosure as well.

In the event of an authentication success (i.e., AuthStatus indicates that the NVMe host is authentic), the method 600 then proceeds to block 616 where the NVMe subsystem transmits a first authentication success communication and a second challenge reply to the NVMe host device, and one of skill in the art in possession of the present disclosure will appreciate how block 616 may not be performed in the event of an authentication failure. With reference to FIG. 8, in an embodiment of block 616 and in response to receiving the access success communication, the controller engine in the NVMe subsystem may perform authentication success operations 812 that include transmitting an authentication success communication to the NVMe host device. In a specific example, the authentication success communication transmitted by the controller engine in the NVMe subsystem may include the following information:

(T_ID, [R2])

As will be appreciated by one of skill in the art in possession of the present disclosure, the "T_ID" component of the authentication success communication in the example above provides a transaction identifier that may be utilized to identify that authentication success communication, and the "R2" component of the authentication success communication in the example above provides the second response in the challenge/response operations. However, while a specific authentication success communication (i.e., a DH-HMAC-CHAP authentication success communication) is described, one of skill in the art in possession of the present disclosure will appreciate that authentication success communications may include other information while remaining within the scope of the present disclosure as well. Furthermore, one of skill in the art in possession of the present disclosure will appreciate that the bi-directional authentication illustrated in FIG. 8 may be replaced by uni-directional authentication (e.g., the authentication verification entity 500 may only perform the operations 808 and 810 to authenticate the NVMe host device, while not performing the operations 814 and 816 to authenticate the NVMe subsystem), in which case the operations 814, 816, and 818 may be omitted.

In a specific example, the second response "R2" included in the authentication success communication may be generated by the controller engine in the NVMe subsystem in NVMe subsystem by performing an HMAC function using the hash function (H) identified in the challenge communication, the secret ("Kc") associated with the NVMe subsystem and stored in the NVMe subsystem as discussed above, a second augmented challenge ("Ca2") that is discussed in further detail below, the second sequence number ("I2"), the transaction identifier ("T_ID") that one of skill in the art in possession of the present disclosure will recognize is constant across the sequence of NVMe host device/NVMe subsystem operations illustrated in FIG. 8, the secure channel creation identifier ("TLS_c"), and any other parameter relevant to the security computation that was provided in the access request message, as detailed below:

R2=HMAC(Kc, Ca2∥I2∥T_ID∥TLS_c)

One of skill in the art in possession of the present disclosure will appreciate that additional elements may be included in the list of concatenated parameters passed to the HMAC function in order to strengthen the security of the resulting response.

Continuing with this specific example, the second augmented challenge "Ca2" utilized to generate the second response "R2" may be generated by the controller engine in the NVMe subsystem in NVMe subsystem by performing the hash function (H) identified in the challenge communication using the second challenge "C2" and the DH exponential parameter "gy mod p" and the DH parameter "y", as detailed below:

Ca2=H(C2∥gxy mod p)

One of skill in the art in possession of the present disclosure will appreciate that augmentation of a challenge with gxy mod p may be computed in other manners that will fall within the scope of the present disclosure as well.

Similarly as discussed above, the host engine in NVMe host device knows "y", and thus may compute (gx mod p)y when it receives gx mod p. Furthermore, the controller engine in NVMe subsystem knows "x", and thus may perform the (gy mod p)x mod p calculation to compute gxy mod p when gy mod p is received from the NVMe host device as gxy mod p=gyx mod p.

The method 600 then proceeds to block 618 where the NVMe host device transmits a second authentication verification request to the authentication verification entity. In one or more embodiments, at block 618 and in response to receiving the access success communication, the host engine in the NVMe host device may perform access request operations 814 that include transmitting an access request communication to the authentication verification entity 500. In a specific example, the access request communication transmitted by the host engine in the NVMe host device may include the following information:

(ID, NQN2, T_ID, AuthID, TLS_c, HashID, DHgID, I2, Ca2, R2)

As will be appreciated by one of skill in the art in possession of the present disclosure, the "ID" component of the access request communication in the example above provides an access request/result identifier that connects the access requests received by the authentication verification entity 500 with the access results provided by the authentication verification entity 500, the "NQN2" component of the access request communication in the example above provides an identifier for the NVMe subsystem, the "T_ID" component of the access request communication in the example above provides a transaction identifier that may be utilized to identify the authentication transaction that access request communication refers to, the "AuthID" component of the access request communication in the example above provides an authentication protocol identifier that may be utilized to identify an authentication protocol for use in the authentication verification operations, the "TLS_c" component of the access request communication in the example above provides a secure channel creation identifier that may be utilized to identify that a secure channel should be established in response to successful authentication verification operations, the "HashID" component of the access request communication in the example above provides an identification of a hash function for use in the authentication verification operations, the "DHgID" component of the access request communication in the example above provides an identification of a DH group for use in the authentication verification operations to provide enhanced security, the "I2" component of the access request communication in the example above provides a second sequence number for use in the authentication verification operations to provide enhanced security, the "Ca2" component of the access request communication in the example above provides the second augmented challenge in the authentication verification operations, and the "R2" component of the access request communication in the example above provides the second response in the challenge/response operations. However, while a specific access request communication (i.e., a DH-HMAC-CHAP access request communication) is described, one of skill in the art in possession of the present disclosure will appreciate that access request communications may include other information while remaining within the scope of the present disclosure as well.

Similarly as discussed above, the "DHgID" component of the access request communication in the example above may not be required for the authentication verification operations discussed below, as the computation of the second augmented challenge "Ca2" causes the verification computation to not depend on the DH exchange, but is provided in the access request communication in the example above for completeness, as it may be included in an authentication verification entity log to record which DH group was used in each authentication verification computation.

The method 600 then proceeds to block 620 where the authentication verification entity verifies a second response in the second challenge reply and transmits a second authentication verification response to the NVMe host device. In one or more embodiments, at block 620 and in response to receiving the access request communication as part of the access request operations 814, the authentication verification engine 504 in the authentication verification entity 500 may perform authentication verification operations that include verifying the second response ("R2") included in the access request communication by performing the HMAC function using the hash function (H) identified in the access request communication, the secret ("Kc") associated with the NVMe subsystem and stored in the authentication verification entity 500 as discussed above, the second augmented challenge ("Ca2"), the second sequence number ("I2"), the transaction identifier ("T_ID") that one of skill in the art in possession of the present disclosure will recognize is constant across the sequence of NVMe host device/NVMe subsystem operations illustrated in FIG. 8, and the secure channel creation identifier ("TLS_c"), as detailed below:

R2=HMAC(Kc, Ca2||I2||T_ID||TLS_c)

One of skill in the art in possession of the present disclosure will recognize that the result of the performance of that HMAC function by the authentication verification entity may be compared to the second response "R2" included in the access request communication to determine whether there is a match (e.g., the "access result" discussed below), with a match verifying the authenticity of the NVMe subsystem, and no match indicating that the NVMe subsystem is not authentic.

With reference to FIG. 8, in an embodiment of block 620 and in response to authenticating the NVMe subsystem, the authentication verification engine 504 in the authentication verification entity 500 may perform access result operations 816 that include transmitting an access result communication to the NVMe host device 206/400. In a specific example, the access result communication transmitted by the authentication verification entity 500 may include the following information:

(ID, AuthStatus)

As will be appreciated by one of skill in the art in possession of the present disclosure, the "ID" component of the access result communication in the example above provides an access request/result identifier that connects the access result provided by the authentication verification entity 500 with the access request transmitted by the NVMe host device, while the "AuthStatus" component provides an authentication status of the authentication operations (e.g., identifying whether the NVMe subsystem is authentic or not). However, while a specific access result communication (i.e., a DH-HMAC-CHAP access result communication) is described, one of skill in the art in possession of the present disclosure will appreciate that access result communications may include other information while remaining within the scope of the present disclosure as well.

In the event of an authentication success (i.e., AuthStatus indicates that the NVMe subsystem is authentic), the method 600 then proceeds to block 622 where the NVMe host device transmits a second authentication success communication to the NVMe subsystem, and one of skill in the art in possession of the present disclosure will appreciate how block 622 may not be performed in the event of an authentication failure. With reference to FIG. 8, in an embodiment of block 622 and in response to receiving the access result communication, the host engine in the NVMe host device may perform authentication success operations 818 that include transmitting an authentication success communication to the NVMe subsystem. In a specific example, the authentication success communication transmitted by the host engine in the NVMe host device may include the following information:

(T_ID)

As will be appreciated by one of skill in the art in possession of the present disclosure, the "T_ID" component of the authentication success communication in the example above provides a transaction identifier that may be utilized to identify that authentication success communication. However, while a specific authentication success communication (i.e., a DH-HMAC-CHAP authentication success communication) is described, one of skill in the art in possession of the present disclosure will appreciate that authentication success communications may include other information while remaining within the scope of the present disclosure as well.

As will be appreciated by one of skill in the art in possession of the present disclosure, in some embodiments the authentication of the NVMe host device and the NVMe subsystem discussed above may complete the security operations that allow the NVMe host device and the NVMe subsystem to securely interact (e.g., the NVMe subsystem may allow the NVMe host device to perform storage operations that result in the storage and/or retrieval of data with the NVM subsystem). However, in other embodiments the authentication of the NVMe host device and the NVMe subsystem discussed above may be utilized as a foundation for a broader security architecture.

Figure 9:
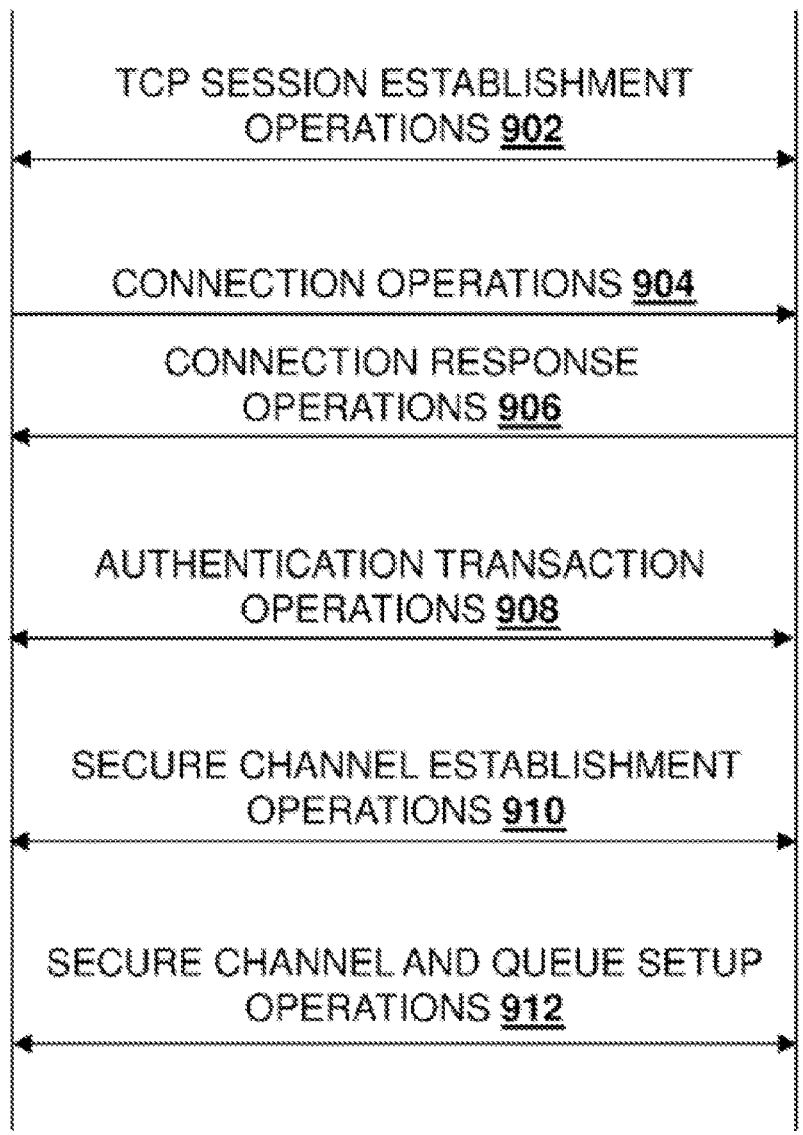
FIG. 9 is a ladder diagram illustrating an embodiment of the NVMe subsystem and the NVMe host device operating prior to, during, and subsequent to the method of FIG. 6.

For example, with reference to FIG. 9, a ladder diagram is illustrated that details security operations 900 that may be performed by the NVMe subsystem and the NVMe host device in the examples provided herein, and one of skill in the art in possession of the present disclosure will appreciate the illustrated operations provide for the authentication of the NVMe host device and (in bidirectional authentication embodiments) the NVMe subsystem that intend to communicate (which must be successfully completed in order to continue secure channel establishment operations), the generation of key material that is shared only between the NVMe subsystem and the NVMe host device, and the establishment of a secure channel between the NVMe subsystem and the NVMe host device in order to provide integrity and confidentiality for the data traffic transmitted thereon. In a specific example, the key material may be provided by a Transport Layer Security Pre-Shared Key (TLS PSK) that may be generated via the following equation:

$$\text{TLS PSK} = \text{HMAC}(Ks, C1 \| C2)$$

where:
$KS = H((gx \bmod p)y \bmod p) = H((gy \bmod p)x \bmod p) = H(gxy \bmod p)$ One of skill in the art in possession of the present disclosure will appreciate that a TLS PSK based on gxy mod p may be computed in other manners that will fall within the scope of the present disclosure as well.

For example, FIG. 9 illustrates how the NVMe subsystem and the NVMe host device may perform Transmission Control Protocol (TCP) session establishment operations 902 in order to establish a TCP session between the NVMe subsystem and the NVMe host device. The NVMe host device may then perform connection operations 904 and the NVMe subsystem may perform connection response operations 906 in order to set up NVMe queues, associate the NVMe host device with the NVMe subsystem, and/or provide other connection results that would be apparent to one of skill in the art in possession of the present disclosure. The NVMe subsystem and the NVMe host device may then perform authentication transaction operations 908 to generate a key that is shared between the NVMe subsystem and the NVMe host device. The NVMe subsystem and the NVMe host device may then perform secure channel establishment operations 910 that may include utilizing the key (e.g., the TLS PSK in the example above) shared during the authentication transaction operations 908 in order to perform a Transaction Layer Security (TLS) negotiation and establish a secure communication channel. The NVMe subsystem and the NVMe host device may then perform secure channel and queue setup operations 912 to configure the secure communication channel and associated queues so that the NVMe subsystem and the NVMe host device are fully configured to securely interact with each other.

Thus, systems and methods have been described that provide a centralized authentication verification entity that operates to offload authentication verification operations from NVMe entities in the NVMe-oF™ system, which allows the NVMe entities to be provisioned with only their associated secret utilized in authentication operations, thus providing a scalable NVMe-oF™ authentication system. For example, the NVMe-oF™ authentication system of the present disclosure may include an authentication verification entity coupled to an NVMe subsystem and an NVMe host device, with the NVMe subsystem is coupled to the NVMe host device. The NVMe subsystem transmits a first challenge to the NVMe host device and, in response, receives a first challenge reply from the NVME host device. The NVMe subsystem then generates a first authentication verification request communication that includes a first response that was provided in the first challenge reply by the NVMe host device using a first instance of a first secret that is stored in the NVMe host device, and transmits the first authentication verification request communication to the authentication verification entity. The authentication verification entity receives the first authentication verification request communication, verifies the first response using a second instance of the first secret that is stored in the authentication verification entity and, in response, transmits a first authentication verification response communication to the NVMe subsystem. As such, the NVMe-oF™ authentication system is linearly configurable (i.e., via the one secret assigned per NVMe entity discussed above), while allowing any two NVMe entities to them utilize a subsequent authentication protocol to generate key material between themselves (e.g., effectively generating an on-the-fly pre-shared key between the two) that may then be utilized to set up a secure communication channel between those NVMe entities.

Embodiments of authenticating are described in co-owned U.S. Prov. Pat. App. No. 63/064,509, filed on Aug. 12, 2020 and U.S. patent application Ser. No. 17/158,912, filed on Jan. 26, 2021, entitled "NVME OVER FABRICS AUTHENTICATION SYSTEM," and listing Claudio DeSanti and David Black as inventors—each of the aforementioned patent documents is incorporated by reference herein in its entirety.

Figure 10:
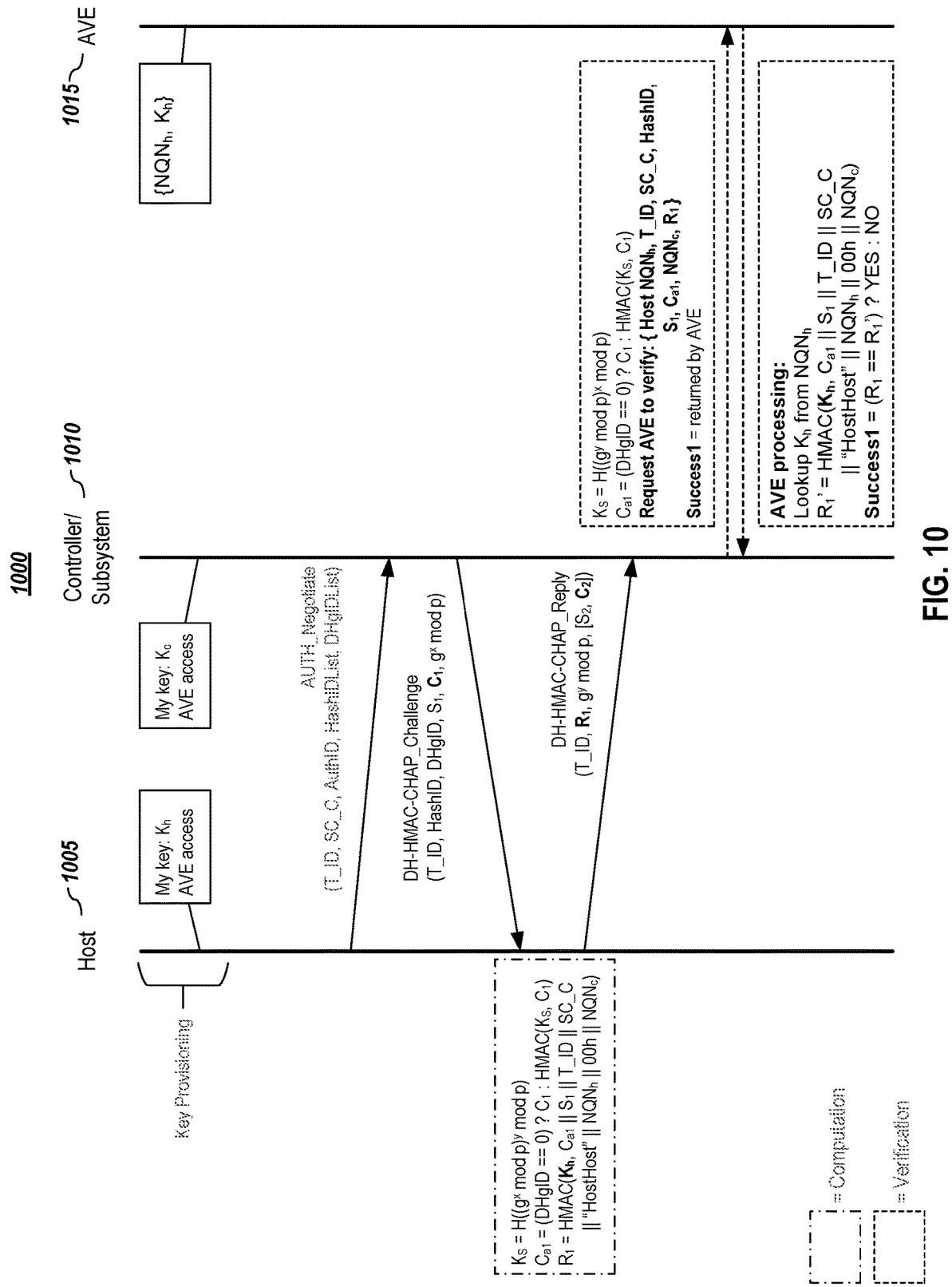
FIGS. 10 and 11 depict example DH-HMAC-CHAP protocol flows with an AVE, according to embodiments of the present disclosure.
Figure 11:
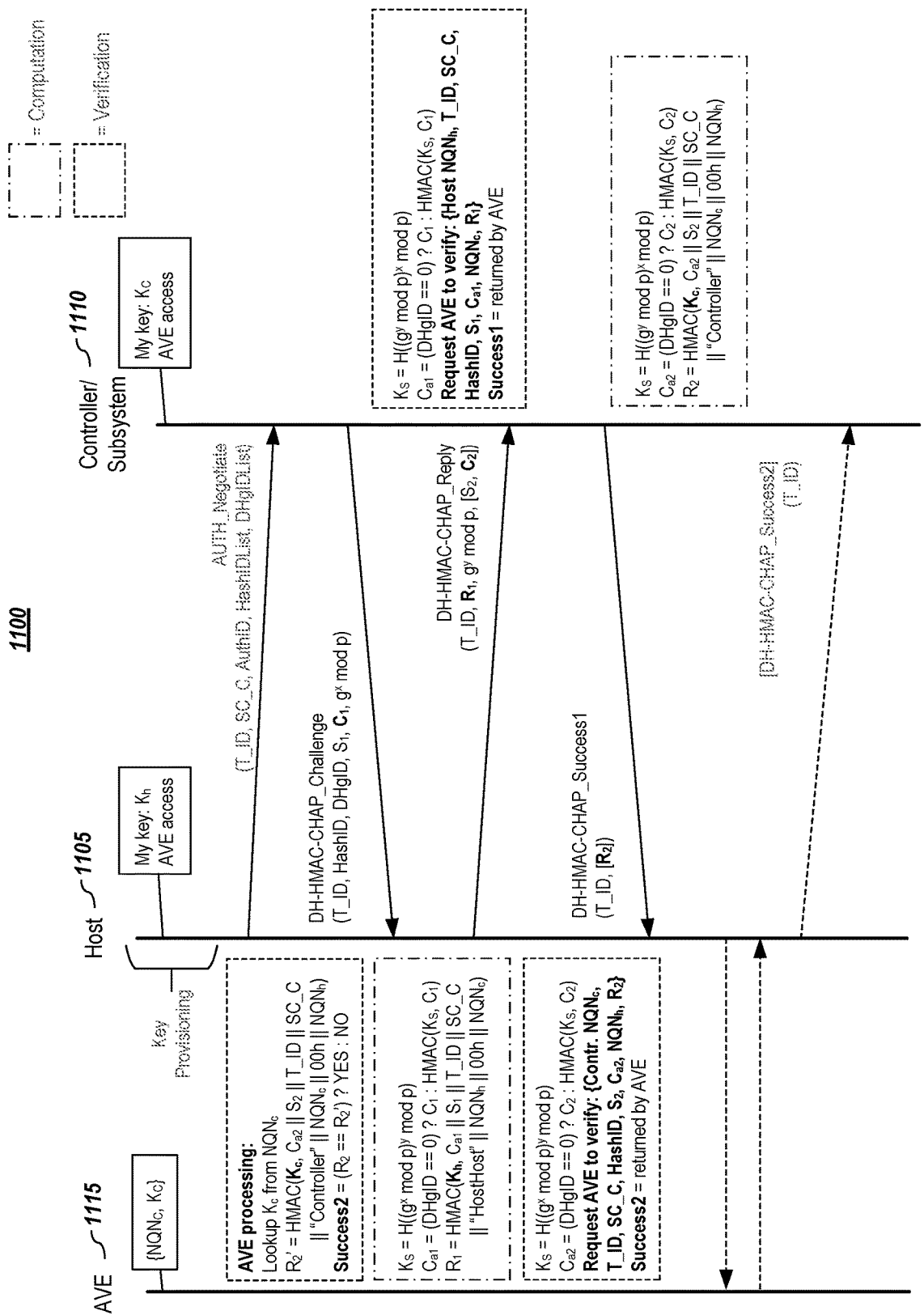

FIGS. 10 and 11 also depict example DH-HMAC-CHAP protocol flows with an AVE, according to embodiments of the present disclosure. As shown in FIG. 10, the controller of a subsystem 1010 sends a challenge $C_1$ to the host, and the host computes its response $R_1$, based on its provisioned key $K_h$. At this point, the controller 1010 sends the authentication parameters exchanged with the host 1005 to the AVE 1015 to verify if the host reply is the expected one. The AVE looks up the host key $K_h$ from its database, computes the expected response $R_1'$ and verifies if $R_1'$ is equal to the response R1 sent by the host. If there is a match, the authentication is successful, and the protocol continues. However, if the values do not match, the protocol aborts and the connection between host and subsystem is torn down or terminated.

As shown in FIG. 11, the host 1105 may also send a challenge $C_2$ to the controller of a subsystem 1110. The controller 1110 computes its response $R_2$, based on its provisioned key $K_c$. It should be noted that in the depicted embodiments the controller of a subsystem is referenced, but it shall be understood that, in one or more embodiments, the entity that is authenticated may be the subsystem and a key referred to as a controller key may be a key for the entire subsystem or portion thereof. At this point, the host sends the authentication parameters exchanged with the controller to the AVE 1115 to verify if the controller's reply is the expected one. The AVE looks up the controller key, $K_c$, from its database, computes the expected response $R_2'$, and verifies if $R_2'$ is equal to the response $R_2$ sent by the host. If the values match, the authentication is successful, and the protocol continues. However, if the values do not match, the protocol aborts and the connection between host and subsystem is turned down or terminated.

Figure 12:
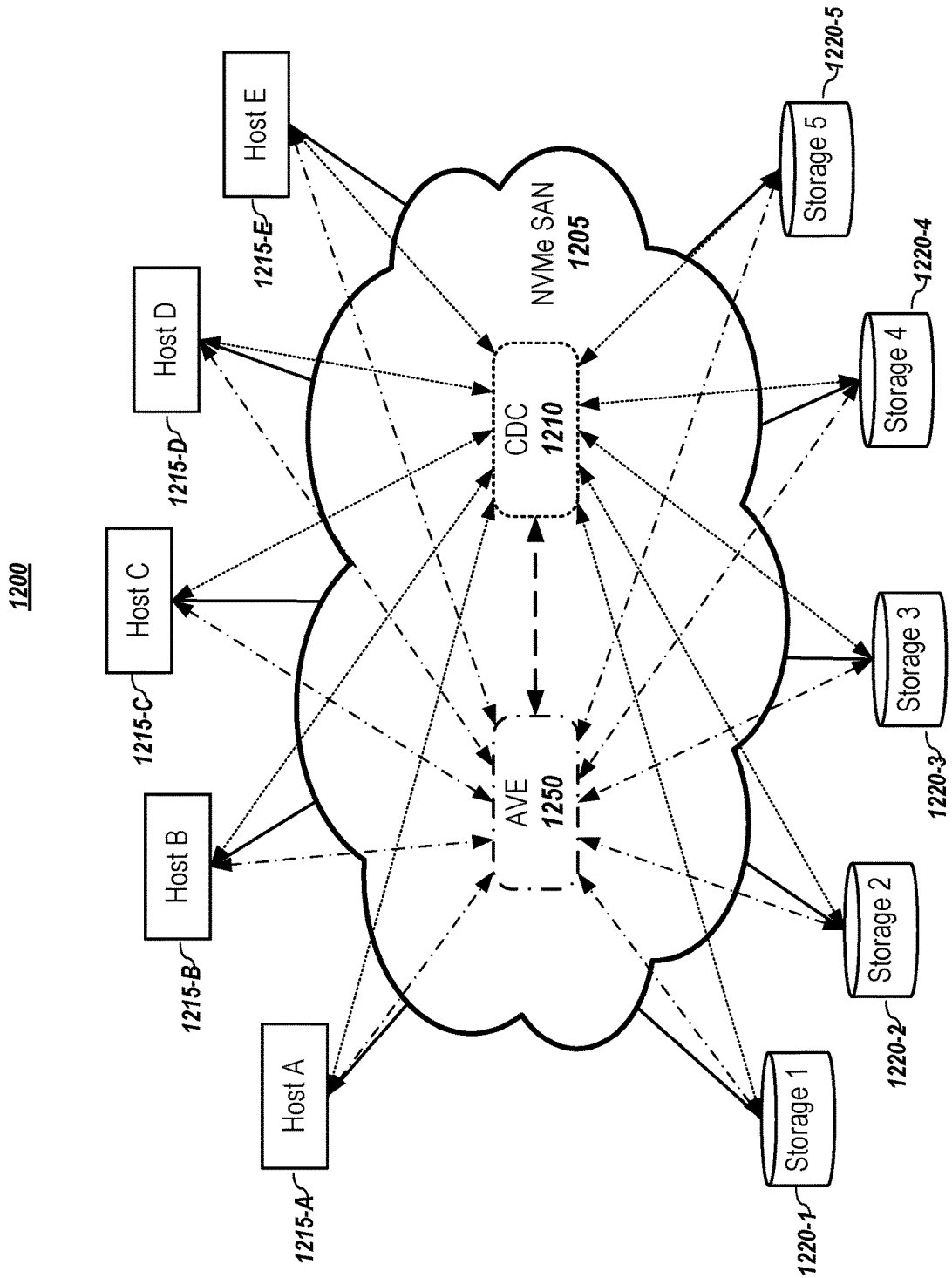
FIG. 12 depicts a fabric with an AVE and CDC, according to embodiments of the present disclosure.

The result of authentication verification is sent by the AVE to the controller and to the host. In both cases, if the authentication verification did not succeed, the connection between the involved host and controller is torn down as a consequence of the authentication verification not succeeding. In other words, the AVE is able to determine if a connection between a host and a subsystem should be established or not. This functionality makes it possible to use the AVE as an agent to facilitate enforcement of zoning in fabrics with both CDC and AVE, as shown in FIG. 12.

In these fabrics, the AVE 1250 is able to ascertain from the zoning configuration on the CDC 1210, which connections between hosts 1215 and subsystems 1220 are allowed and which ones are not. In one or more embodiments, the CDC 1210 sends to the AVE 1250 the list of host-subsystem pairs allowed to communicate after each zoning configuration change. Either the AVE or CDC may initiate this communication (e.g., AVE may request that the CDC send the information to it, the CDC may push the information to the AVE, or both). In one or more alternative embodiments, the AVE may query the CDC as part of an authentication verification as an alternative to obtaining all of the zoning information in advance. In one or more embodiments, the AVE uses this information when performing authentication verifications or an authentication-like process that checks access control/zoning rights.

For example, in one or more embodiments, if a connection between a host and a subsystem is allowed by the zoning configuration on the CDC (i.e., the host and subsystem identified by their respective NQNs are allowed to communicate), the AVE performs authentication verification as expected (e.g., as shown in FIG. 10 and FIG. 11). However, if a connection between a host and a subsystem is not allowed by the zoning configuration on the CDC (i.e., the host and subsystem identified by their respective NQNs that are authenticating each other are not allowed to communicate), then the AVE returns an authentication verification failure, without the need to perform any authentication verification.

As already noted, when the AVE returns an authentication verification failure, the connection between the involved host and subsystem is torn down and in this way the AVE is able to inhibit the establishment of connections not allowed by the fabric zoning configurations (i.e., the AVE is able to enforce the fabric zoning configuration). It should be noted that this mechanism works for both DH-HMAC-CHAP unidirectional authentication, in which only the host is authenticated through the challenge/reply exchange shown in FIG. 10, as well as for DH-HMAC-CHAP bidirectional authentication, in which both parties authenticate each other, as shown in FIG. 11.

Depending on the fabric security requirements, the AVE may indicate to the subsystem or host using it that zoning-caused access denial is the reason for the authentication failure. In one or more embodiments, the AVE may not indicate that zoning was the reason for the access denial. Not indicating the reason can provide better security as it provides less information to a potential attacker.

Figure 13:
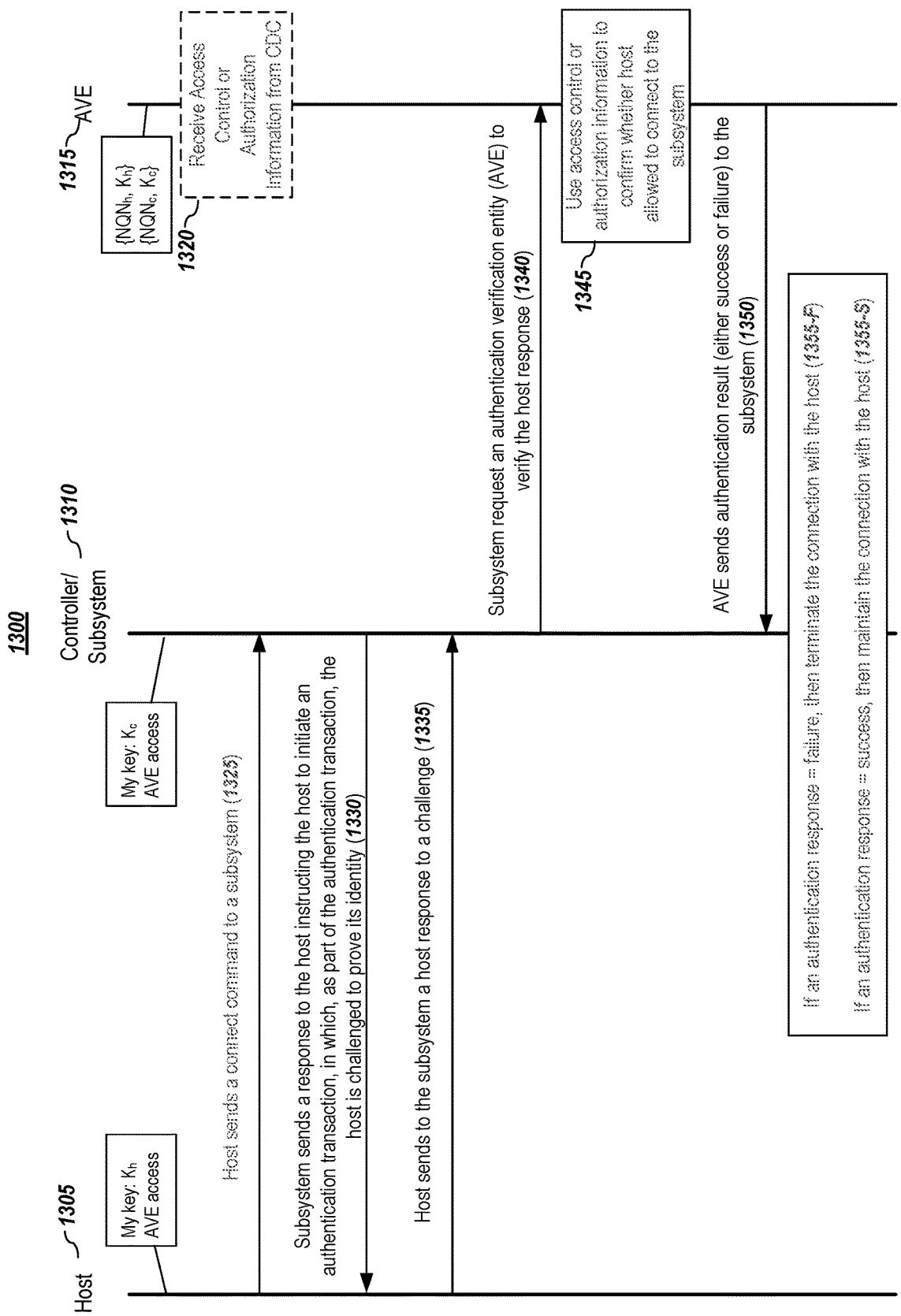
FIG. 13 depicts a methodology for using an AVE for enforcing access control or authorization control, according to embodiments of the present disclosure.

FIG. 13 depicts a methodology for using an AVE for enforcing access control or authorization control, according to embodiments of the present disclosure. As depicted, the AVE 1315 may receive (1320) access control or authorization information, which may be zoning information, from a centralized discovery controller (CDC) (not depicted in FIG. 13). In one or more embodiments, the access control or authorization information at the AVE is kept current as changes are made at the CDC. It shall be noted that, in one or more embodiments, step 1320 may not occur initially. For example, in one or more embodiments, the AVE may query the CDC as part of an authentication verification (e.g., step 1345) to obtain the zoning information. Such an approach has the benefits that the AVE need not maintain a complete copy of the zoning information that is maintained by the CDC and the amount of data transmitted is reduced. Furthermore, by querying for the relevant zoning information when needed, the AVE will be using the most current information.

In one or more embodiments, a host 1305 sends (1325) a connect command to a subsystem 1310 in the fabric. Responsive to the subsystem receiving the connect command from the host via a connection, the subsystem 1310 sends (1330) a response to the host 1305, instructing the host to initiate an authentication transaction, in which, as part of the authentication transaction, the host is challenged to prove its identity. The host 1305 sends (1335) a host response to the challenge, and responsive to receiving the host response to the challenge, the subsystem 1310 requests (1340) the AVE to verify the host response.

The AVE uses the information received from the CDC to determine (1345) whether the host 1305 is allowed to connect with the subsystem 1310 and sends (1350) a response to the subsystem. The response may be either a success or failure response depending upon the determined results. That is, if the host 1305 is allowed to connect to the subsystem 1310, the AVE 1315 sends (1350) an authentication success response. And, if the host 1305 is not allowed to connect to the subsystem 1310, the AVE 1315 sends (1350) an authentication failure response.

Responsive to receiving from the AVE 1315 an authentication successful response, the subsystem maintains (1355-S) the connection with the host. But, responsive to receiving from the AVE 1315 an authentication failure response that was generated as a result of the AVE determining, based upon authorization information or access control information, that the host 1305 is not authorized or allowed to connect to the subsystem 1310, the subsystem 1310 terminates (1355-F) the connection with the host 1305.

Figure 14:
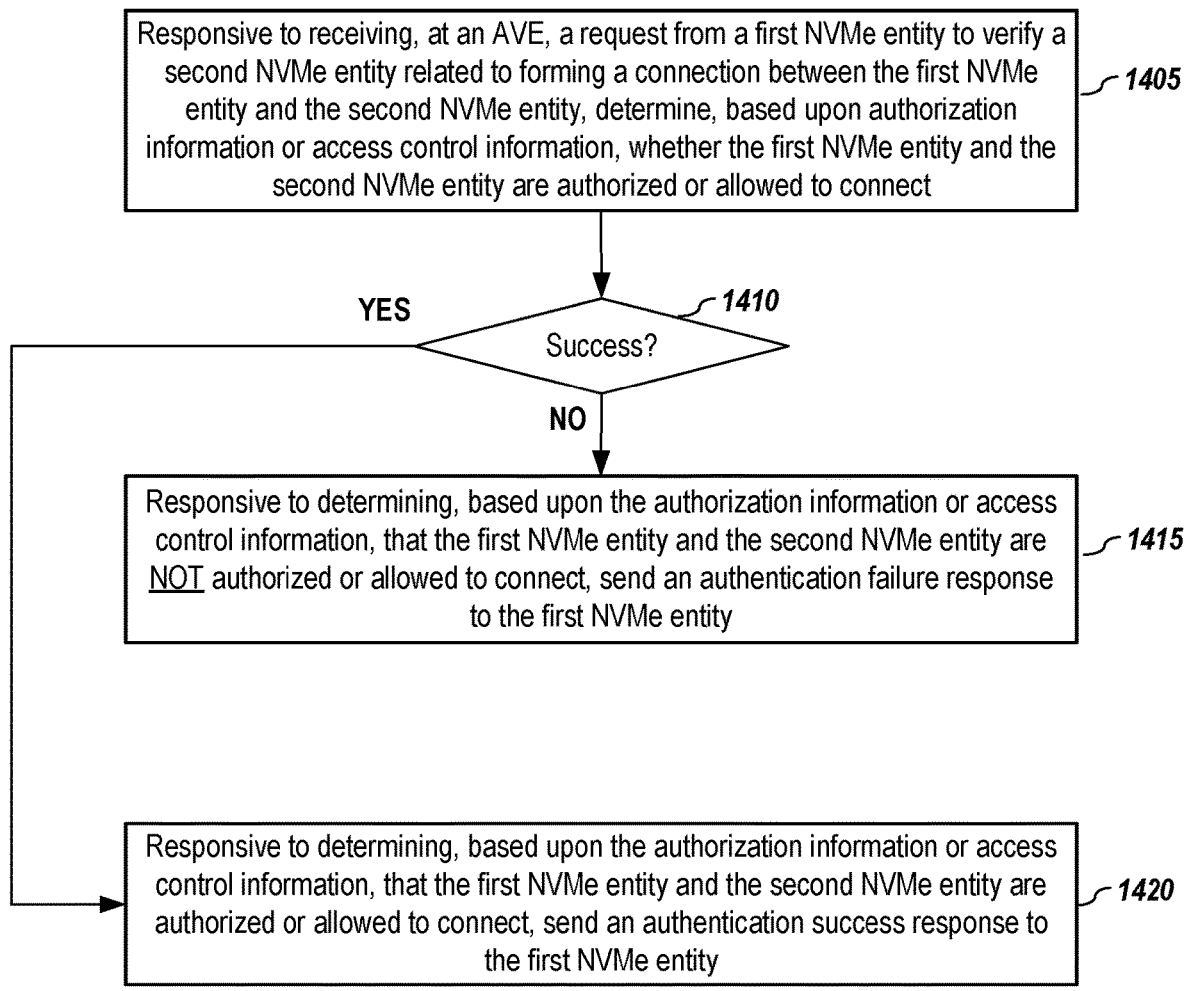
FIG. 14 depicts a methodology for an AVE to enforce access control or authorization control, according to embodiments of the present disclosure.

FIG. 14 depicts a methodology for an AVE to enforce access control or authorization control, according to embodiments of the present disclosure. Responsive to receiving, at an authentication verification entity (AVE), a request from a first NVMe entity to verify a second NVMe entity related to forming a connection between the first NVMe entity and the second NVMe entity, the AVE determines (1405), based upon authorization information or access control information, whether the first NVMe entity and the second NVMe entity are authorized or allowed to connect. In one or more embodiments, the authorization information or access control information may be zoning information, which may be received from a centralized discovery controller.

In one or more embodiments, responsive to determining (1410), based upon the authorization information or access control information, that the first NVMe entity and the second NVMe entity are not authorized or allowed to connect, the AVE may send (1415) an authentication failure response to the first NVMe entity.

In one or more embodiments, responsive to determining (1410), based upon the authorization information or access control information, that the first NVMe entity and the second NVMe entity are authorized or allowed to connect, the AVE may send (1420) an authentication success response to the first NVMe entity.

It shall be noted that, in one or more embodiments, it may be preferable that the AVE also performs authentication verification of the NVMe entity before sending a successful response. Such embodiments are discussed below with respect to FIG. 15. However, in one or more embodiments, it may be beneficial to have the AVE send a successful response if the authorization information or access control information is correct. For example, this check may be a feature separate from authentication that may be requested and performed by the AVE. Additionally, or alternatively, such a feature may be useful for testing and/or diagnostics. For example, receiving such a response may be useful to test that an AVE and a CDC are interacting correctly without setting up all of the security configurations and secrets needed to perform full authentication verification.

Figure 15:
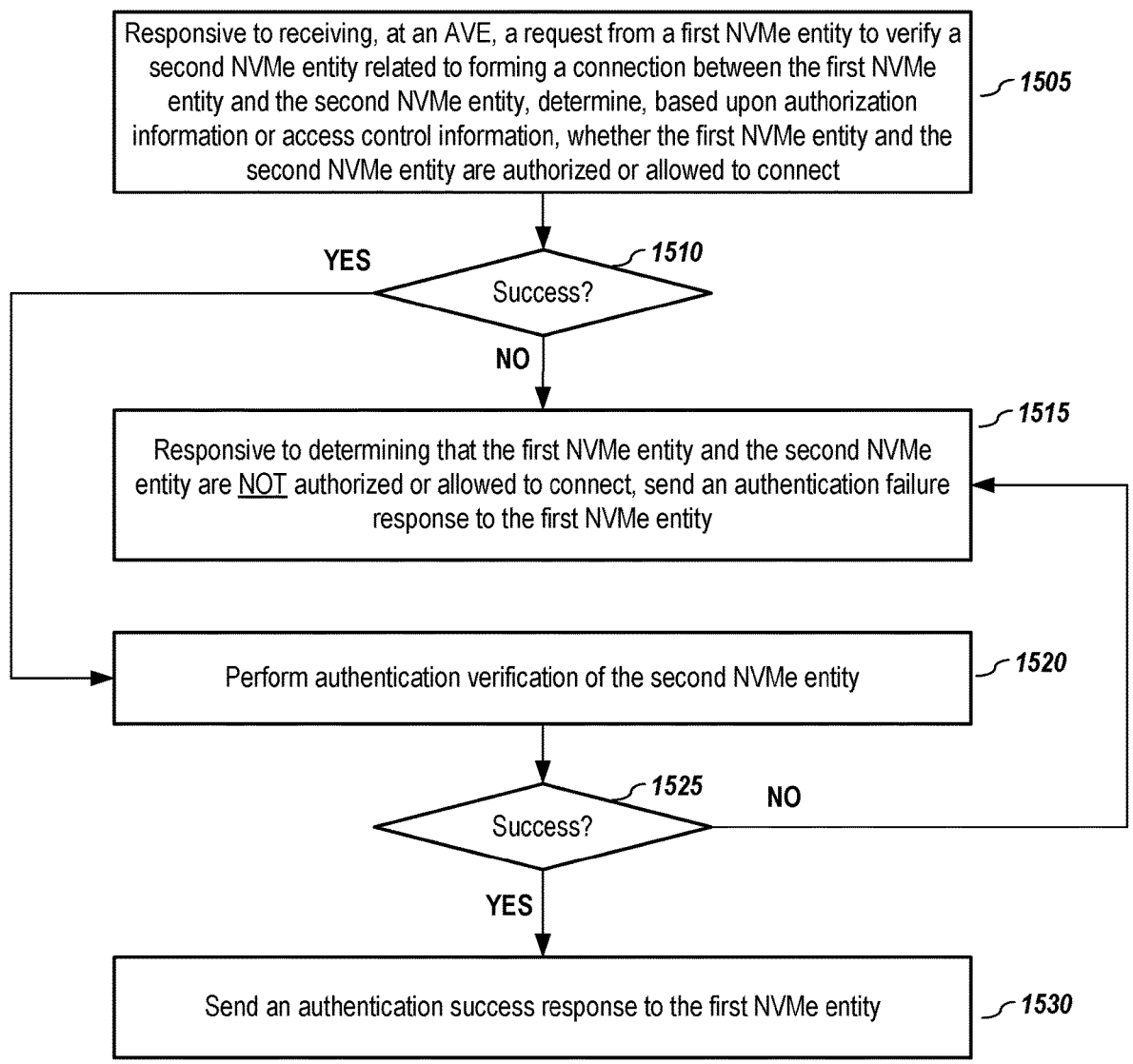
FIG. 15 depicts yet another methodology for an AVE to enforce access control or authorization control, according to embodiments of the present disclosure.

FIG. 15 depicts a methodology for an AVE to enforce access control or authorization control, according to embodiments of the present disclosure. Responsive to receiving, at an authentication verification entity (AVE), a request from a first NVMe entity to verify a second NVMe entity related to forming a connection between the first NVMe entity and the second NVMe entity, the AVE determines (1505), based upon authorization information or access control information, whether the first NVMe entity and the second NVMe entity are authorized or allowed to connect. In one or more embodiments, the authorization information or access control information may be zoning information, which may be received from a centralized discovery controller.

In one or more embodiments, responsive to determining (1510), based upon the authorization information or access control information, that the first NVMe entity and the second NVMe entity are not authorized or allowed to connect, the AVE may send (1515) an authentication failure response to the first NVMe entity.

In one or more embodiments, responsive to determining (1510), based upon the authorization information or access control information, that the first NVMe entity and the second NVMe entity are authorized or allowed to connect, the AVE proceeds to perform authentication verification based on the identity of the host, the subsystem, or both.

For example, as depicted in FIG. 15, following a successful check for access control/authorization, the AVE may verify (1520) the authentication information of the second NVMe entity. Responsive to successful verification (1525) of the authentication information of the second NVMe entity, the AVE may then send (1530) an authentication successful response to the first NVMe entity indicating that the connection is authorized. However, responsive to not being able to successfully verify the authentication information of the second NVMe entity, the AVE may then send (1515) an authentication failure response to the first NVMe entity.

Note that in the depicted embodiment, responsive to determining, based upon the authorization information or access control information, that the first NVMe entity and the second NVMe entity are not authorized or allowed to connect, the AVE need not perform the authentication verification (step 1520). This approach saves time and processing resources. Also note that, in the depicted embodiment, the failure response sent at step 1515 does not indicate whether the failure response was generated as a result of: (1) whether the AVE determined based upon authorization information or access control information, that the first NVMe entity and the second NVMe entity are not authorized or allowed to connect; or (2) whether the AVE was not able to successfully verify the authentication information of the second NVMe entity. As discussed above, not providing this information may be beneficial for security reasons. However, in one or more embodiments, the failure response may indicate the reason for failure.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 16:
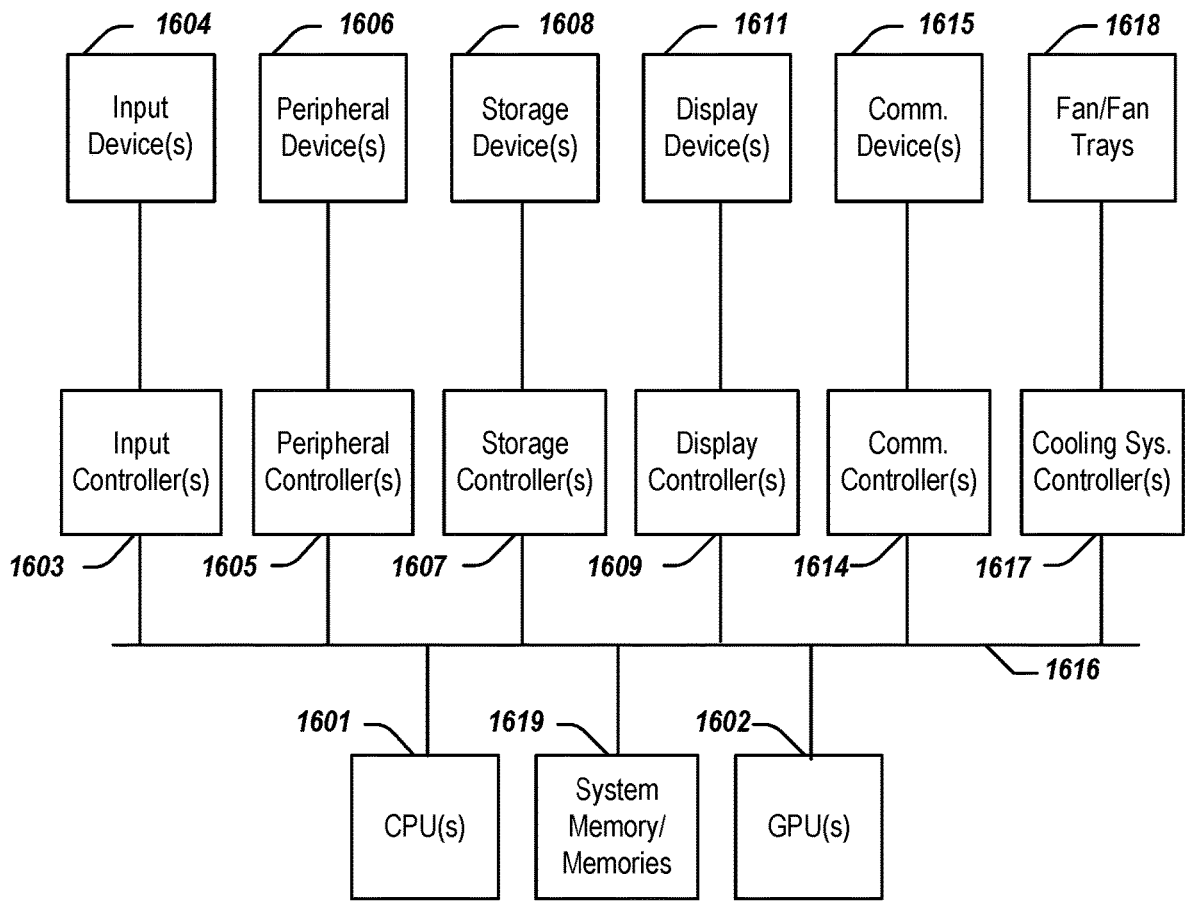
FIG. 16 depicts a simplified block diagram of an information handling system, according to embodiments of the present disclosure.

FIG. 16 depicts a simplified block diagram of an information handling system (or computing system), according to embodiments of the present disclosure. It will be understood that the functionalities shown for system 1600 may operate to support various embodiments of a computing system—although it shall be understood that a computing system may be differently configured and include different components, including having fewer or more components as depicted in FIG. 16.

As illustrated in FIG. 16, the computing system 1600 includes one or more CPUs 1601 that provides computing resources and controls the computer. CPU 1601 may be implemented with a microprocessor or the like and may also include one or more graphics processing units (GPU) 1602 and/or a floating-point coprocessor for mathematical computations. In one or more embodiments, one or more GPUs 1602 may be incorporated within the display controller 1609, such as part of a graphics card or cards. The system 1600 may also include a system memory 1619, which may comprise RAM, ROM, or both.

A number of controllers and peripheral devices may also be provided, as shown in FIG. 16. An input controller 1603 represents an interface to various input device(s) 1604, such as a keyboard, mouse, touchscreen, stylus, microphone, camera, trackpad, display, etc. The computing system 1600 may also include a storage controller 1607 for interfacing with one or more storage devices 1608 each of which includes a storage medium such as magnetic tape or disk, or an optical medium that might be used to record programs of instructions for operating systems, utilities, and applications, which may include embodiments of programs that implement various aspects of the present disclosure. Storage device(s) 1608 may also be used to store processed data or data to be processed in accordance with the disclosure. The system 1600 may also include a display controller 1609 for providing an interface to a display device 1611, which may be a cathode ray tube (CRT) display, a thin film transistor (TFT) display, organic light-emitting diode, electroluminescent panel, plasma panel, or any other type of display. The computing system 1600 may also include one or more peripheral controllers or interfaces 1605 for one or more peripherals 1606. Examples of peripherals may include one or more printers, scanners, input devices, output devices, sensors, and the like. A communications controller 1614 may interface with one or more communication devices 1615, which enables the system 1600 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1600 comprises one or more fans or fan trays 1618 and a cooling subsystem controller or controllers 1617 that monitors thermal temperature(s) of the system 1600 (or components thereof) and operates the fans/fan trays 1618 to help regulate the temperature.

In the illustrated system, all major system components may connect to a bus 1616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 17:
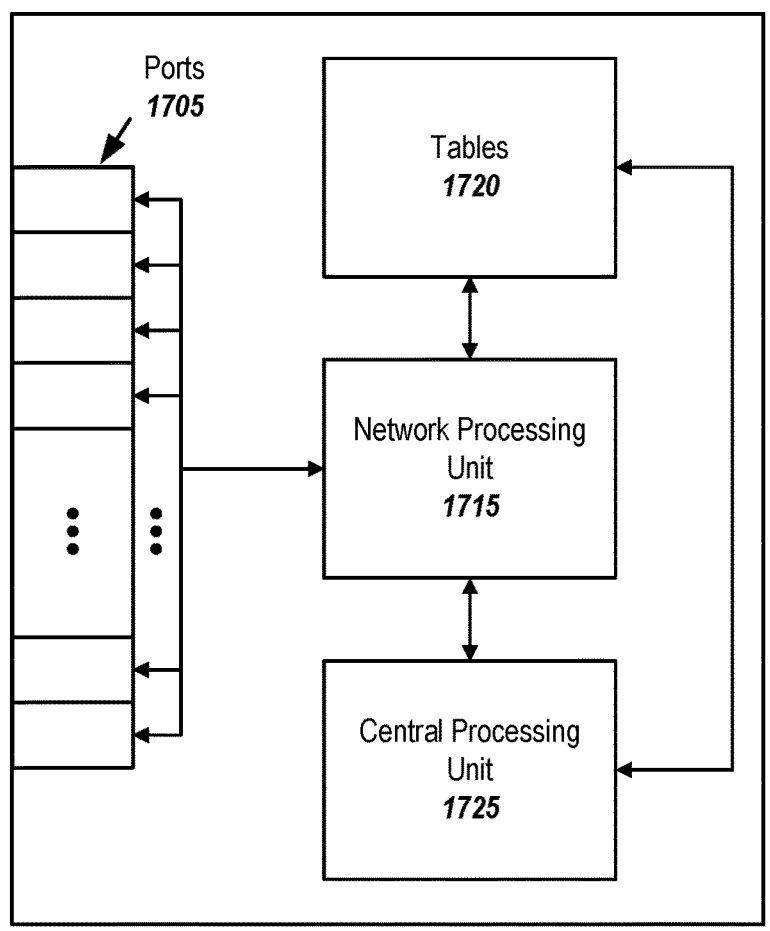
FIG. 17 depicts an alternative block diagram of an information handling system, according to embodiments of the present disclosure.

FIG. 17 depicts an alternative block diagram of an information handling system, according to embodiments of the present disclosure. It will be understood that the functionalities shown for system 1700 may operate to support various embodiments of the present disclosure—although it shall be understood that such system may be differently configured and include different components, additional components, or fewer components.

The information handling system 1700 may include a plurality of I/O ports 1705, a network processing unit (NPU) 1715, one or more tables 1720, and a CPU 1725. The system includes a power supply (not shown) and may also include other components, which are not shown for sake of simplicity.

In one or more embodiments, the I/O ports 1705 may be connected via one or more cables to one or more other network devices or clients. The network processing unit 1715 may use information included in the network data received at the node 1700, as well as information stored in the tables 1720, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:
responsive to a subsystem receiving a connect command from a host via a connection, sending a response to the host instructing the host to initiate an authentication transaction, in which, as part of the authentication transaction, the host is challenged to prove its identity;
responsive to receiving a host response to a challenge, requesting an authentication verification entity (AVE) to verify the host response; and
responsive to receiving from the AVE an authentication failure response that facilitates enforcement of zoning because the authentication failure response was generated as a result of the AVE determining, based upon zoning-related information, that the host is not authorized or allowed to connect to the subsystem, terminating the connection with the host.

2. The computer-implemented method of claim 1 wherein:
the AVE uses zoning-related information as a preliminary factor in deciding whether to send an authentication failure response.

3. The computer-implemented method of claim 2 wherein:
the zoning-related information is received by the AVE via a centralized discovery controller.

4. The computer-implemented method of claim 1 wherein:
responsive to receiving from the AVE an authentication successful response, maintaining the connection with the host.

5. The computer-implemented method of claim 4 wherein before sending the authentication successful response, the AVE also authenticates the host using the host response and an AVE authentication database.

6. The computer-implemented method of claim 5 wherein an authentication failure response is sent in response to the AVE not being able to authenticate the host response even when the AVE determined that the host is authorized or allowed to connect to the subsystem according to the zoning-related information.

7. The computer-implemented method of claim 6 wherein the authentication failure response does not indicate a reason for failure—whether the failure was based upon enforcement of zoning or whether the host failed to authenticate.

8. A computer-implemented method comprising:
responsive to receiving, at an authentication verification entity (AVE), a request from a first non-volatile memory express (NVMe) entity to perform authentication verification of a second NVMe entity related to forming a connection between the first NVMe entity and the second NVMe entity, determining, based upon zoning-related information, whether the first NVMe entity and the second NVMe entity are authorized or allowed to connect; and
responsive to determining, based upon the zoning-related information, that the first NVMe entity and the second NVMe entity are not authorized or allowed to connect, sending an authentication failure response to the first NVMe entity to facilitate enforcement of zoning.

9. The computer-implemented method of claim 8 wherein:
the AVE uses the zoning-related information as a preliminary factor in deciding whether to send an authentication failure response.

10. The computer-implemented method of claim 9 wherein:
the zoning-related information is received by the AVE via a centralized discovery controller.

11. The computer-implemented method of claim 8 wherein:
responsive to determining, based upon the zoning-related information, that the first NVMe entity and the second NVMe entity are authorized or allowed to connect:
performing authentication verification of the second NVMe entity;
responsive to successful authentication verification of the second NVMe entity, sending an authentication successful response to the first NVMe entity indicating that the connection is authorized; and
responsive to authentication verification of the second NVMe entity not being successful, sending an authentication failure response to the first NVMe entity.

12. The computer-implemented method of claim 8 wherein the step of responsive to determining, based upon the zoning-related information, that the first NVMe entity and the second NVMe entity are not authorized or allowed to connect, further comprises:
using the determination, based upon the zoning-related information, that the first NVMe entity and the second NVMe entity are not authorized or allowed to connect as sufficient reason, without performing authentication verification, to send the authentication failure response.

13. The computer-implemented method of claim 11 wherein the authentication failure response does not indicate whether the authentication failure response was generated as a result of:
(1) whether the AVE determined based upon zoning-related information, that the first NVMe entity and the second NVMe entity are not authorized or allowed to connect; or
(2) whether authentication verification of the second NVMe entity by the AVE was unsuccessful.

14. The computer-implemented method of claim 8 wherein the first NVMe entity is a storage subsystem and the second NVMe entity is a host.

15. An information handling system comprising:
one or more processors; and
a non-transitory computer-readable medium or media comprising one or more sets of instructions which, when executed by at least one of the one or more processors, causes steps to be performed comprising:
responsive to a first entity receiving a connect command from a host second entity, sending a response to the host second entity instructing the second entity to initiate an authentication transaction;
responsive to receiving a second entity response to a challenge, requesting an authentication verification entity (AVE) to authenticate the second entity; and
responsive to receiving from the AVE a failure response that was generated as a result of the AVE determining, based upon zoning-related information, that the second entity is not authorized or allowed to connect to the first entity according to the zoning-related information, terminating connection with the second entity.

16. The information handling system of claim 15 wherein:
the AVE uses the zoning-related information as a factor in deciding whether to send a failure response; and
the AVE does not proceed to perform authentication verification if the first entity and second entity are not authorized or allowed to connect according to the zoning-related information.

17. The information handling system of claim 15 wherein the non-transitory computer-readable medium or media further comprises one or more sequences of instructions which, when executed by at least one of the one or more processors, causes steps to be performed comprising:
responsive to receiving from the AVE an authentication successful response, maintaining the connection with the second entity.

18. The information handling system of claim 17 wherein before sending the authentication successful response, the AVE also authenticates the second entity using the second entity response and an AVE authentication database.

19. The information handling system of claim 18 wherein a failure response is sent in response to the AVE not being able to authenticate the second entity even when the AVE has determined that the second entity is authorized or allowed to connect to the first entity.

20. The information handling system of claim 19 wherein the failure response does not indicate a reason for failure.

\* \* \* \* \*